US012245336B2

(12) United States Patent
Uchiyama et al.

(10) Patent No.: US 12,245,336 B2
(45) Date of Patent: *Mar. 4, 2025

(54) COMMUNICATION DEVICE AND COMMUNICATION METHOD

(71) Applicant: Sony Group Corporation, Tokyo (JP)

(72) Inventors: Hiromasa Uchiyama, Tokyo (JP); Naoki Kusashima, Kanagawa (JP); Kazuyuki Shimezawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 18/305,405

(22) Filed: Apr. 24, 2023

(65) Prior Publication Data

US 2023/0262842 A1 Aug. 17, 2023

Related U.S. Application Data

(63) Continuation of application No. 16/649,139, filed as application No. PCT/JP2018/030559 on Aug. 17, 2018, now Pat. No. 11,659,624.

(30) Foreign Application Priority Data

Sep. 29, 2017 (JP) .................................. 2017-189762

(51) Int. Cl.
*H04W 88/04* (2009.01)
*H04W 4/40* (2018.01)
(Continued)

(52) U.S. Cl.
CPC ............ *H04W 88/04* (2013.01); *H04W 4/40* (2018.02); *H04W 28/26* (2013.01); *H04W 72/02* (2013.01); *H04W 92/18* (2013.01)

(58) Field of Classification Search
None
See application file for complete search history.

(56) References Cited

U.S. PATENT DOCUMENTS 11,659,624 B2 *  5/2023  Uchiyama ..........  H04B 7/15528
                                                                  370/329
2008/0137556 A1   6/2008  Park et al.
(Continued)

FOREIGN PATENT DOCUMENTS

CN        103733708 A        4/2014
CN        106576354 A        4/2017
(Continued)

OTHER PUBLICATIONS

International Search Report and Written Opinion mailed on Oct. 30, 2018 for PCT/JP2018/030559 filed on Aug. 17, 2018, 10 pages.
(Continued)

*Primary Examiner* — Anh Vu H Ly
(74) *Attorney, Agent, or Firm* — XSENSUS LLP

(57) ABSTRACT

A communication device that operates as a terminal under control of a base station, includes: a communication unit that transmits and receives wireless signals; and a control unit that controls transmission of data using a predetermined resource pool by the communication unit. The control unit determines implementation of relay communication for a packet within the predetermined resource pool on the basis of at least one of information received from the base station, information received from another terminal, or information obtained from the terminal itself, during packet reception, and performs the relay communication by using a resource secured by a transmission source terminal, the terminal itself, or the base station.

17 Claims, 18 Drawing Sheets

(51) Int. Cl.
  *H04W 28/26* (2009.01)
  *H04W 72/02* (2009.01)
  *H04W 92/18* (2009.01)

(56) References Cited

U.S. PATENT DOCUMENTS

| | | |
|---|---|---|
| 2010/0020774 A1 | 1/2010 | Mahajan et al. |
| 2010/0275082 A1 | 10/2010 | Haustein et al. |
| 2013/0003689 A1 | 1/2013 | Kwon et al. |
| 2016/0381720 A1 | 12/2016 | Baek |
| 2017/0126306 A1 | 5/2017 | Kim et al. |
| 2017/0201461 A1* | 7/2017 | Cheng .................. H04W 72/56 |
| 2017/0245245 A1 | 8/2017 | Kim et al. |
| 2018/0092017 A1 | 3/2018 | Freda et al. |
| 2018/0124771 A1 | 5/2018 | Mok et al. |
| 2018/0234163 A1 | 8/2018 | Yasukawa et al. |
| 2018/0262887 A1 | 9/2018 | Futaki |
| 2018/0288588 A1 | 10/2018 | Uchiyama |
| 2018/0332564 A1 | 11/2018 | Lee et al. |
| 2019/0174278 A1* | 6/2019 | Fujishiro ................. H04W 4/40 |
| 2019/0182840 A1 | 6/2019 | Feng et al. |
| 2019/0394786 A1* | 12/2019 | Parron .................... H04W 4/46 |
| 2020/0008030 A1 | 1/2020 | Kim et al. |
| 2020/0077434 A1 | 3/2020 | Kim et al. |
| 2020/0084811 A1 | 3/2020 | Uchiyama et al. |
| 2020/0092685 A1* | 3/2020 | Fehrenbach .......... H04W 76/14 |
| 2020/0120458 A1* | 4/2020 | Aldana ................... H04W 4/08 |
| 2020/0221423 A1* | 7/2020 | Wang .................... H04W 72/02 |
| 2021/0051628 A1* | 2/2021 | Zhang ................. H04W 72/121 |

FOREIGN PATENT DOCUMENTS

| | | |
|---|---|---|
| EP | 3148285 A1 | 3/2017 |
| EP | 3537830 A1 | 9/2019 |
| EP | 3606216 A1 | 2/2020 |
| JP | 2008-061227 A | 3/2008 |
| JP | 2017-139659 A | 8/2017 |
| RU | 2545187 C1 | 3/2015 |
| WO | 2011/083570 A1 | 7/2011 |
| WO | 2016/159000 A1 | 10/2016 |
| WO | 2016/182601 A1 | 11/2016 |
| WO | 2017/003161 A1 | 1/2017 |

OTHER PUBLICATIONS

Sony: "Discussion on sidelink resource allocation and configuration", 3GPP Draft; R1-1708264 Discussi on on Sidelink Resource Allocation and Configuration, 3rd Generation Partnership Project (3GPP), Mobile Competence Centre; 650, Route Des Lucioles ; F-06921 Sophia-Anti, vol. RAN WG1, No. Hangzhou; May 15, 2017-May 19, 2017, May 14, 2017 (May 14, 2017), XP051273457.

* cited by examiner

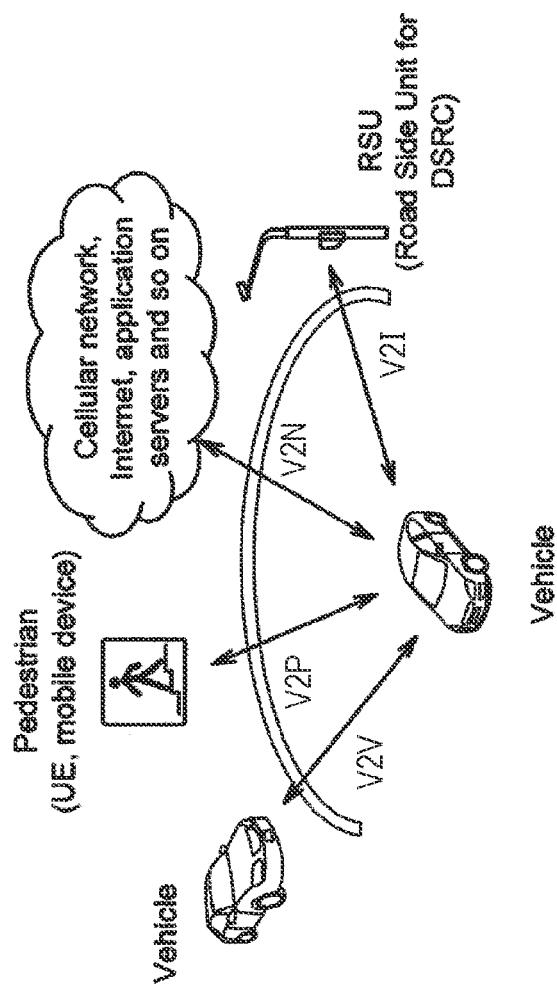
FIG. 1
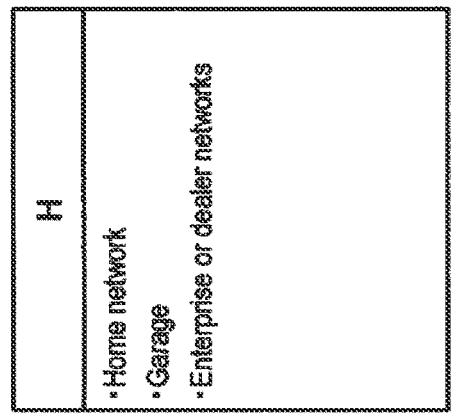
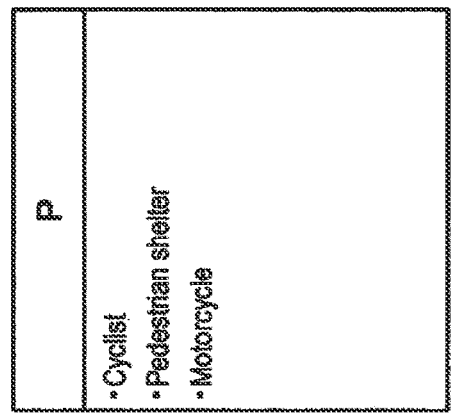
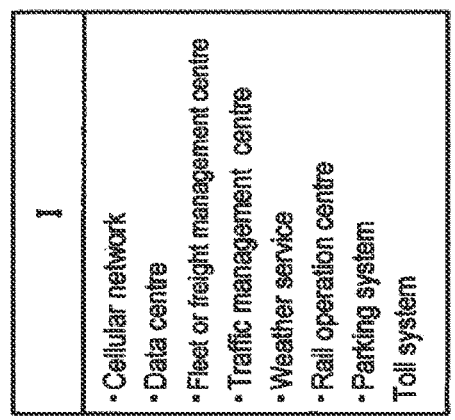
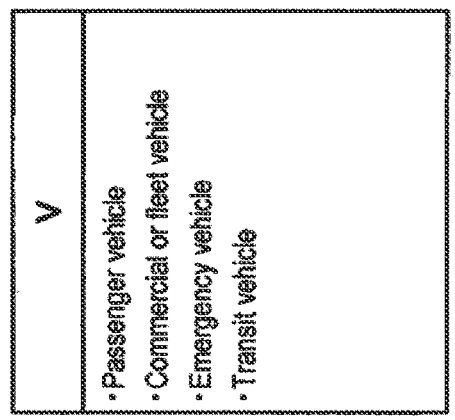

COMMUNICATION DEVICE AND COMMUNICATION METHOD

CROSS-REFERENCE TO RELATED APPLICATIONS

The present application is a continuation of U.S. patent application Ser. No. 16/649,139, filed Mar. 20, 2020, which is based on PCT filing PCT/JP2018/030559, filed Aug. 17, 2018, which claims priority to JP 2017-189762, filed Sep. 29, 2017, the entire contents of each are incorporated herein by reference.

TECHNICAL FIELD

The technology disclosed in this specification relates to a communication device and a communication method that perform direct communication between terminals.

BACKGROUND ART

In recent years, expectations for in-vehicle communication (V2X communication) have increased to realize future automatic driving. V2X communication is an abbreviation for Vehicle to X communication, and is a system in which a vehicle communicates with "something". Examples of "something" here include a vehicle, an infrastructure, a network, a pedestrian, and the like (V2V, V2I/N, V2P).

As for wireless communication for automobiles, the development of IEEE 802.11p-based Dedicated Short Range Communication (DSRC) has been mainly progressed so far. In recent years, in Third Generation Partnership Project (3GPP), standardization has been carried out of "LTE-based V2X" that is Long Term Evolution (LTE) based in-vehicle communication. In 3GPP, V2X standardization activities continue further in 5G (New Radio (NR)) (see, for example, Patent Document 1).

CITATION LIST

Patent Document

Patent Document 1: Japanese Patent Application Laid-Open No. 2017-139659

SUMMARY OF THE INVENTION

Problems to be Solved by the Invention

An object of the technology disclosed in this specification is to provide a communication device and a communication method that perform direct communication between terminals.

Solutions to Problems

A first aspect of the technology disclosed in this specification is a communication device that operates as a terminal under control of a base station, the communication device including:
  a communication unit that transmits and receives wireless signals; and
  a control unit that controls transmission of data using a predetermined resource pool by the communication unit, in which
  the control unit controls implementation of relay communication for a packet within the predetermined resource pool on the basis of at least one of information received from the base station, information received from another terminal, or information obtained from the terminal itself, during packet reception.

The control unit determines implementation of relay communication on the basis of information that is received from the base station and that indicates an area in which relay communication should be performed or an area in which relay communication may be performed, an instruction for implementation of relay communication or an instruction for stop of relay communication from the base station.

Furthermore, the control unit is information regarding a method of allocating a resource for transmission of the packet, the information being obtained from a transmission source terminal of the packet, priority information of the packet, freshness information of the packet, The control unit determines implementation of relay communication on the basis of at least one of a congestion level of a channel used for communication of the packet, a state of the channel, retransmission information of the packet, or position information of the terminal itself.

Furthermore, the control unit further controls securing of a resource for relay communication. The control unit controls sensing of a resource for relay communication within the resource pool, or controls implementation of relay communication for the packet using a resource for relay communication reserved by a transmission source terminal of the packet, or controls implementation of relay communication for the packet using a resource for relay communication secured by the base station.

Furthermore, the control unit further controls the implementation probability of relay communication for the packet depending on freshness information of the packet, priority information of the packet, channel congestion level, and the like.

Furthermore, a second aspect of the technology disclosed in this specification is a communication method in a communication device that operates as a terminal under control of a base station, the communication method including the steps of:
  receiving a packet in a predetermined resource pool; and
  controlling implementation of relay communication for the packet on the basis of at least one of information received from the base station, information received from another terminal, or information obtained from the terminal itself.

Effects of the Invention

According to the technology disclosed in this specification, it is possible to provide a communication device and a communication method that perform direct communication between terminals.

Note that, the effects described in this specification are merely examples, and the effects of the present invention are not limited to them. Furthermore, the present invention may have additional effects other than the effects described above.

Still other objects, features, and advantages of the technology disclosed in this specification will become apparent from the detailed description based on embodiments and attached drawings to be described later.

BRIEF DESCRIPTION OF DRAWINGS

FIG. 1 is a diagram illustrating an outline of V2X communication.

MODE FOR CARRYING OUT THE INVENTION

Figure 2:
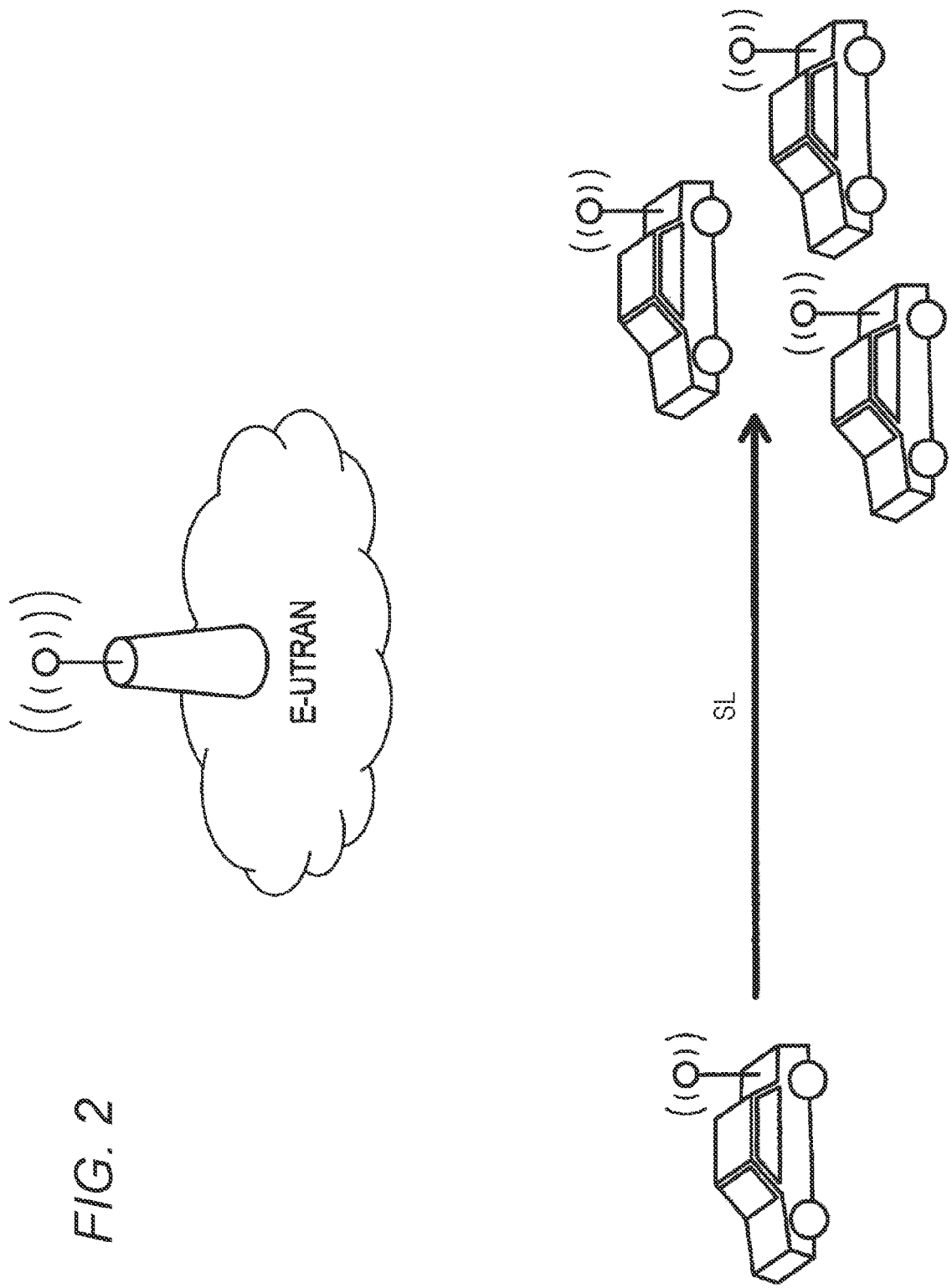
FIG. 2 is a diagram illustrating a first scenario of V2V communication.

Hereinafter, embodiments of the technology disclosed in this specification will be described in detail with reference to the drawings.

A. System Configuration

By mounting a communication device on a mobile body such as a vehicle, direct communication is realized between the mobile body and various objects. In particular, communication between the vehicle and various objects is called V2X communication. FIG. 1 illustrates an outline of V2X communication. As illustrated, examples of V2X communication include Vehicle to Vehicle (V2V) communication, Vehicle to Infrastructure (V2I) communication, Vehicle to Pedestrian (V2P) communication, Vehicle to Home (V2H) communication, and the like. Furthermore, although not illustrated, Vehicle to Network (V2N) communication is also included in V2X communication. Note that the first and third characters of V2X communication mean the start point and end point of communication, respectively, and do not limit the communication path. For example, V2V communication is a concept that includes both communication between vehicles directly and communication between vehicles indirectly via a base station or the like.

Examples of a communication target of the vehicle in V2V communication include a passenger vehicle, a commercial or fleet vehicle, an emergency vehicle, and a transit vehicle. Furthermore, examples of a communication target of the vehicle in V2I communication include a cellular network, a data centre, a fleet or freight management centre, a traffic management centre, a weather service, a rail operation centre, a parking system, a toll system, and the like. Furthermore, examples of a communication target of the vehicle in V2P communication include a cyclist, a pedestrian shelter, a motorcycle, and the like. Furthermore, examples of a communication target of the vehicle in V2H communication include a home network, a garage, an enterprise or dealer network, and the like.

Examples of a communication target of the vehicle in V2V communication include a passenger vehicle, a commercial or fleet vehicle, an emergency vehicle, and a transit vehicle. Furthermore, examples of a communication target of the vehicle in V2I communication include a cellular network, a data centre, a fleet or freight management centre, a traffic management centre, a weather service, a rail operation centre, a parking system, a toll system, and the like. Furthermore, examples of a communication target of the vehicle in V2P communication include a cyclist, a pedestrian shelter, a motorcycle, and the like. Furthermore, examples of a communication target of the vehicle in V2H communication include a home network, a garage, an enterprise or dealer network, and the like.

As for wireless communication for automobiles, the development of IEEE 802.11p-based DSRC has been mainly progressed so far, but in recent years, in 3GPP, standardization has been carried out of LTE-based V2X (described above). In LTE-based V2X communication, exchange of basic safety message and the like is supported, for example.

On the other hand, with the aim of further improving V2X communication, enhanced V2X (eV2X) communication using 5G technology is being examined in 3GPP. In eV2X communication, new use cases are supported that require high reliability, low latency, high-speed communication, and high capacity, which have not been supported by LTE-based V2X before. Use cases and requirements for eV2X are described in 3GPP TR22.886. Examples of the main use cases supported by eV2X include the following (1) to (4).

(1) Vehicle Platooning

This is a use case of platooning, in which a plurality of vehicles forms a platoon and travels in the same direction, and information is exchanged for controlling platooning from a vehicle that leads the platooning. By exchanging such information, an inter-vehicle distance can be reduced in the platooning.

(2) Extended Sensors

Exchange of sensor-related information (raw data before data processing and processed data) is enabled between vehicles, and the like. Sensor information is collected through a local sensor, a surrounding vehicle, a road side unit (RSU), a live video image between pedestrians, a V2X application server, and the like. By exchanging such information, the vehicle can acquire information that cannot be obtained by its own sensor information, and can acknowledge or recognize a wider range of environments. Since a lot of information needs to be exchanged, a high data rate is required for communication.

(3) Advanced Driving

Semi-automatic driving and fully automatic driving are enabled. Each vehicle allows the RSU to share acknowledgment/recognition information obtained from each vehicle's own sensor and the like with surrounding vehicles, so that each vehicle's track and operation can be adjusted in synchronization and coordination with the surrounding vehicles. Each vehicle can also share an aim or intention of driving with the surrounding vehicles.

(4) Remote Driving

A remote operator or V2X application is allowed to perform remote operation. Remote operation is used for a person who cannot drive or for a hazardous area. For public transportation for which the route and the road for traveling are determined to some extent, it is also possible to use operation based on cloud computing. High reliability and low transmission delay are required for communication.

To realize the use cases (1) to (4) as described above, enhancement is required of the physical layer of eV2X communication. Examples of a main enhancement include improvement of communication between an infrastructure and a terminal, and improvement of communication between terminals. As the communication between an infrastructure and a terminal, V2N communication and V2I communication (evolved Node B (eNB) type RSU (base station type RSU) communication) are targeted for improvement. Furthermore, as the communication between terminals, V2V communication and V2P communication are targeted for improvement. Points are described below of the main enhancement considered to be necessary in the physical layer of these V2X communications.

Channel format
    Flexible numerology
    short Transmission Time Interval (TTI)
    Multi antenna support
    Waveform enhancement
Sidelink feedback communication
    Hybrid Automatic Repeat Request (HARQ)
    Channel Status Information (CSI)
Resource allocation method in sidelink communication
Vehicle position information estimation technology.
Relay communication between terminals.
Support for unicast communication and multicast communication
Multi-carrier communication and carrier aggregation
High frequency (millimeter wave) support (example: higher than or equal to 6 GHz)

In this specification, attention is paid in particular to relay communication between terminals or sidelink relay communication among the enhancements of the physical layer of eV2X communication, and details of this point will be described later.

There are various operation scenarios of V2X communication. The operation scenario of V2X communication is configured on the basis of V2V communication, and when one automobile is replaced with Pedestrian, the communication becomes V2P communication, and when the end point is an infrastructure or a network, the communication becomes V2I communication or V2N communication. FIGS. 2 to 6 exemplify scenarios of V2V communication that are the basis of V2X communication.

FIG. 2 illustrates a first scenario of V2V communication. In the first scenario, mobile bodies such as vehicles perform V2V communication directly. The communication link in which the vehicles directly communicate with each other in this case is a sidelink (SL).

Figure 3:
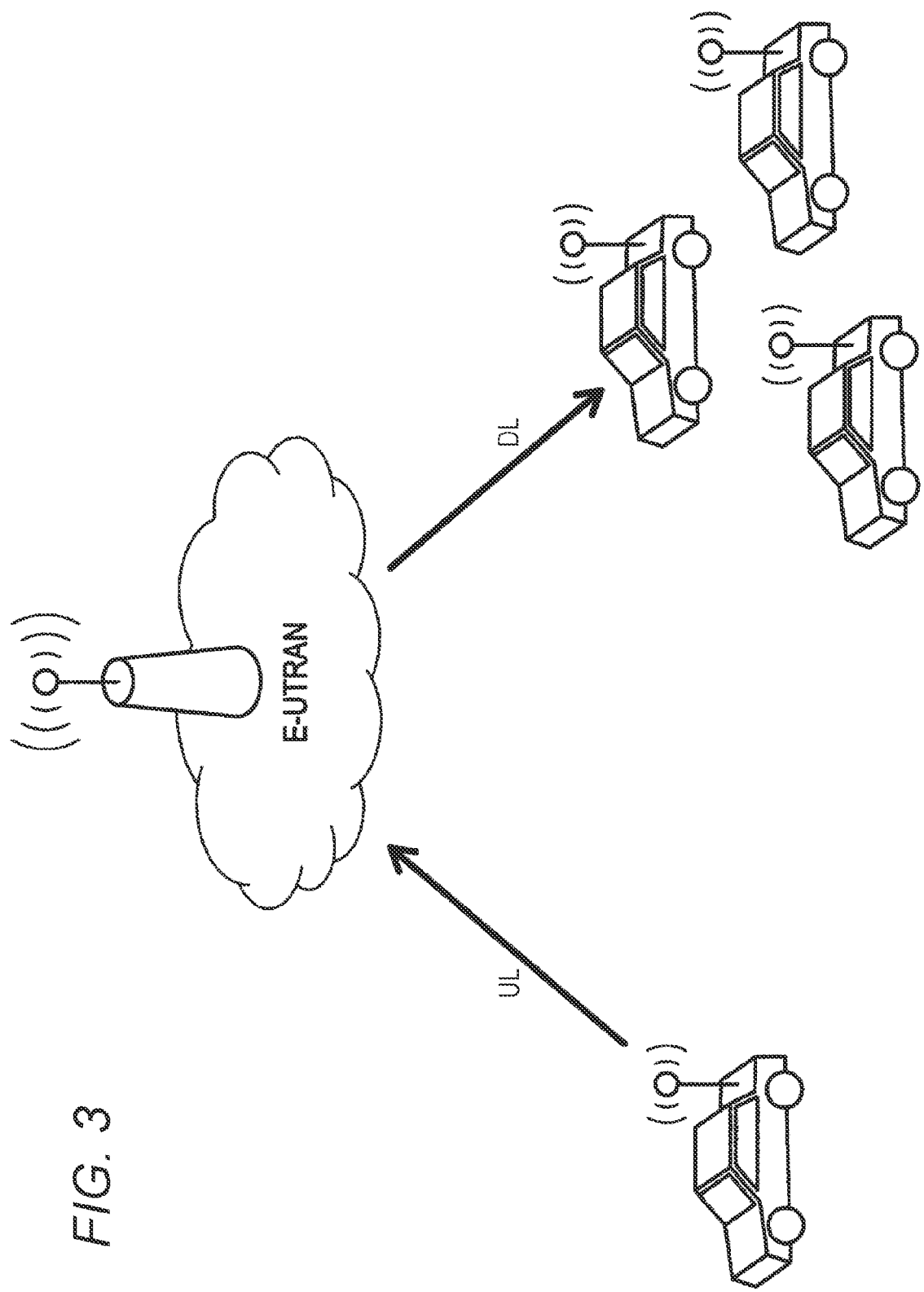
FIG. 3 is a diagram illustrating a second scenario of V2V communication.

FIG. 3 illustrates a second scenario of V2V communication. In the second scenario, mobile bodies such as vehicles perform V2V communication indirectly via an Evolved Universa Terrestrial Radio Access (E-UTRAN), that is, via a base station. The communication link from the transmission side to the base station is an uplink (UL), and the communication link from the base station to the reception side is a downlink (DL).

Figure 4:
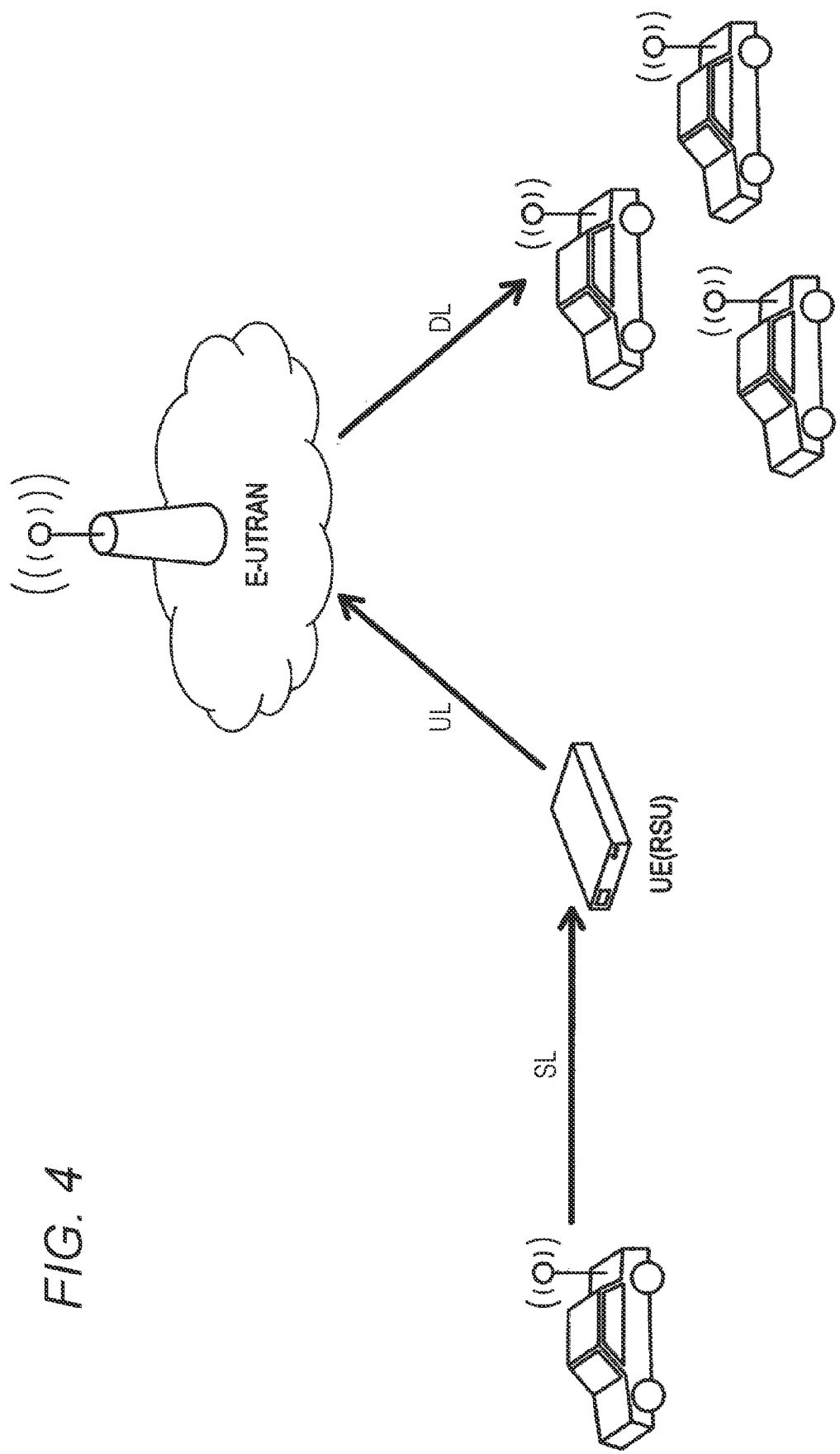
FIG. 4 is a diagram illustrating a third scenario of V2V communication.

FIG. 4 illustrates a third scenario of V2V communication. In the third scenario, a mobile body such as a vehicle transmits a signal to other mobile bodies via an RSU or RSU type user terminal (User Equipment (UE)) and an E-UTRAN in order. Communication links between the devices are an SL, UL, and DL in order.

Figure 5:
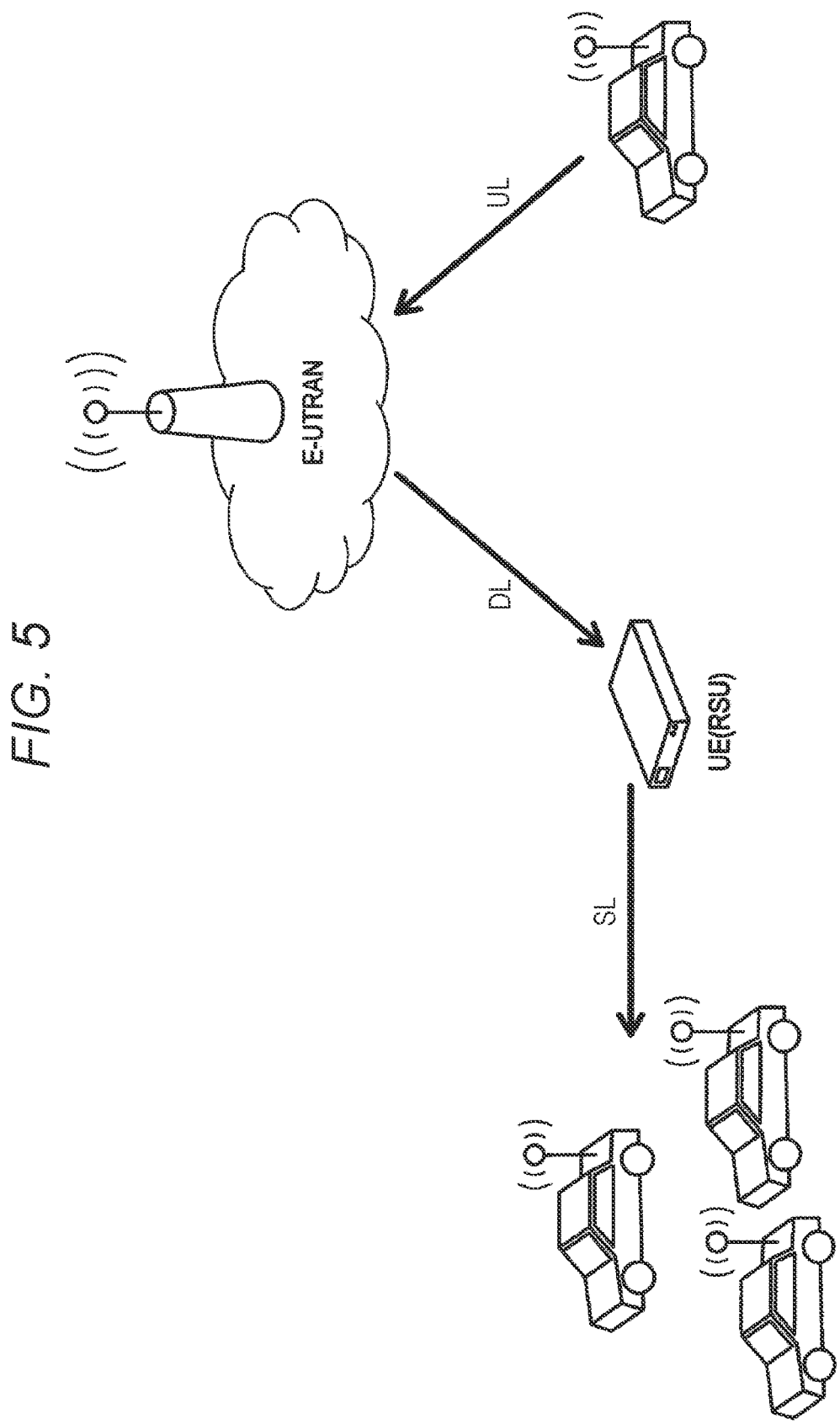
FIG. 5 is a diagram illustrating a fourth scenario of V2V communication.

FIG. 5 illustrates a fourth scenario of V2V communication. In the fourth scenario, a mobile body such as a vehicle transmits a signal to other mobile bodies via an E-UTRAN and RSU or RSU type UE in order. Communication links between the devices are an UL, DL, and SL in order.

Figure 6:
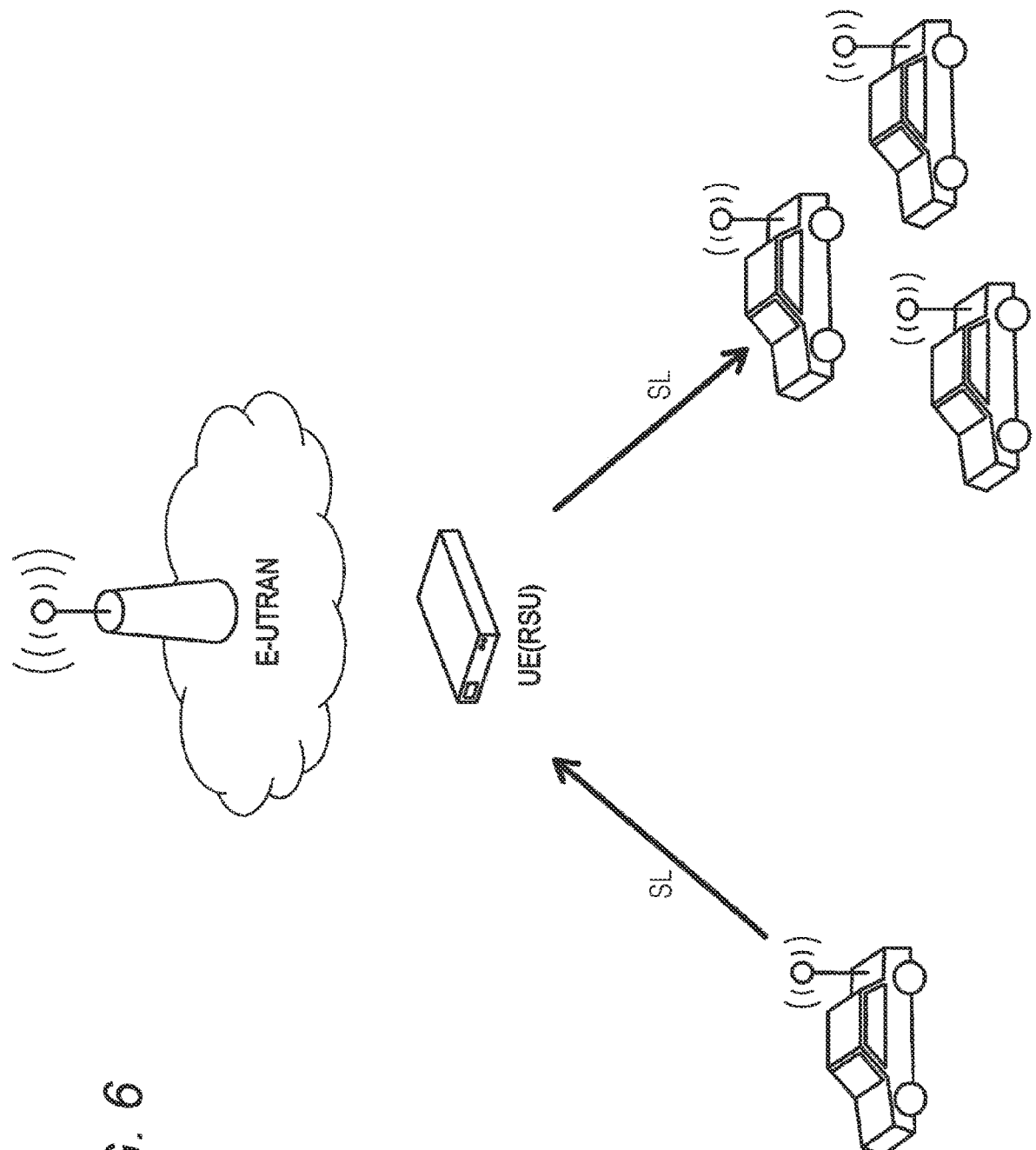
FIG. 6 is a diagram illustrating a fifth scenario of V2V communication.

FIG. 6 illustrates a fifth scenario of V2V communication. In the fifth scenario, mobile bodies such as vehicles perform V2V communication indirectly via an RSU or RSU type UE. The communication link between the mobile body and the RSU or RSU type UE is an SL.

Each scenario illustrated in FIGS. 2 to 6 becomes a scenario of V2P communication when one of the mobile bodies is changed to a pedestrian. Similarly, each scenario becomes a scenario of V2I communication or V2N communication when one of the mobile bodies is changed to an infrastructure or a network.

Figure 7:
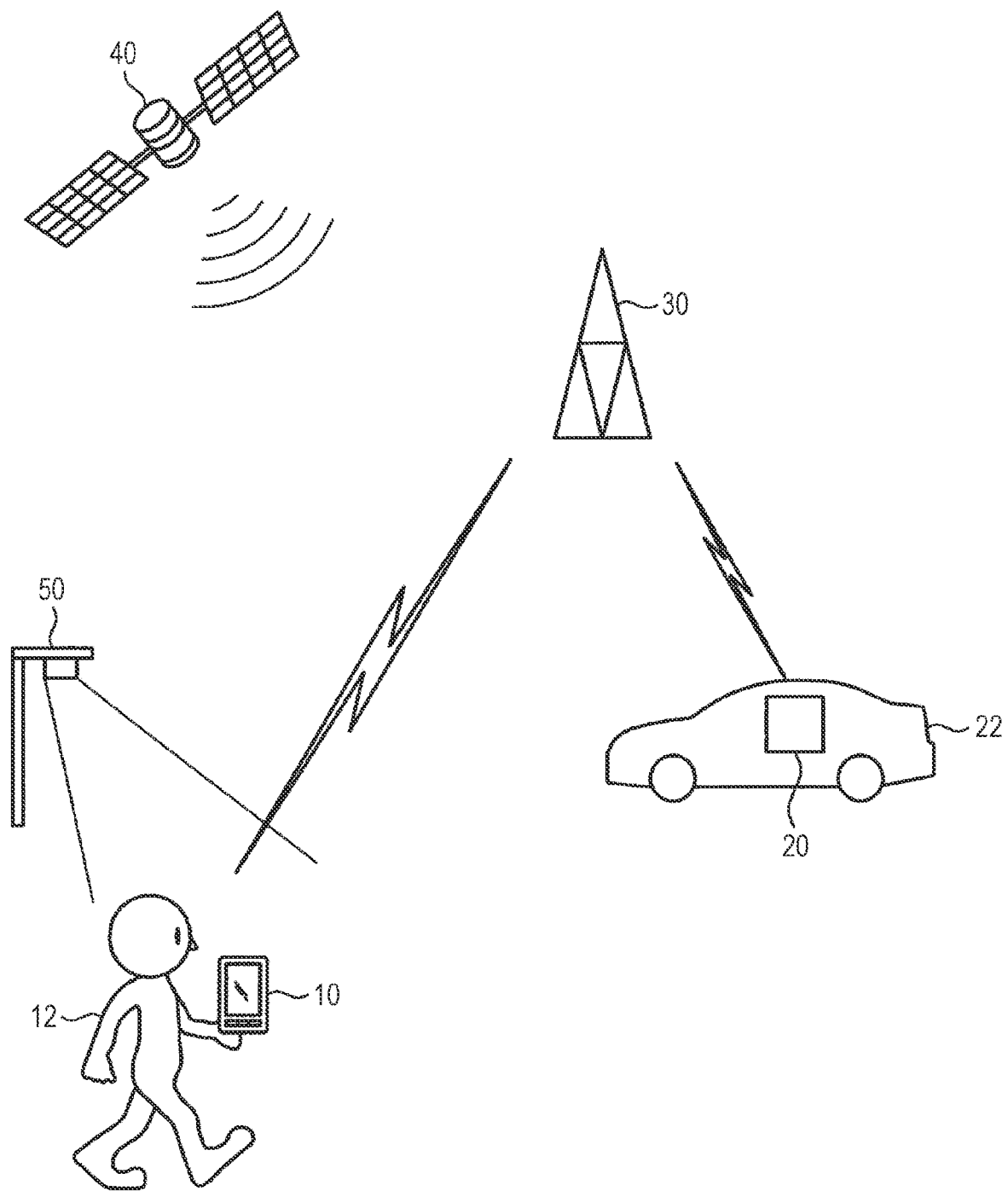
FIG. 7 is a diagram schematically illustrating a configuration example of a wireless communication system in which V2X communication is performed.

FIG. 7 schematically illustrates a configuration example of a wireless communication system in which V2X communication is performed. The illustrated wireless communication system includes a UE 10, a UE 20, a vehicle 22, an eNB (base station) 30, a Global Navigation Satellite System (GNSS) satellite 40, and an RSU 50.

The eNB 30 is a cellular base station that provides a cellular communication service to the UE 20 positioned in a cell. For example, the eNB 30 schedules a resource for the UE 10 and the UE 20 to communicate with each other, and notifies the UE 10 and the UE 20 of the scheduled resource. Then, the eNB 30 performs uplink communication or downlink communication between the UE 10 and the UE 20 with the resource.

The GNSS satellite 40 is an artificial satellite (communication device) that orbits the earth along a predetermined orbit. The GNSS satellite 40 transmits a GNSS signal including a navigation message. The navigation message includes various types of information for position measurement, such as orbit information and time information of the GNSS satellite 40.

The RSU 50 is a communication device installed at the roadside. The RSU 50 can perform bidirectional communication with the vehicle 22 or the UE 20 mounted on the vehicle 22, or the UE 10 carried by a user 12. Note that, the RSU 50 can perform DSRC communication with the vehicle 22 or the UE 20 mounted on the vehicle 22, or the UE 10 carried by the user 12. Furthermore, in the present embodiment, it is also assumed that the RSU 50 communicates with the vehicle 22 or the UE 20 mounted on the vehicle 22, or the UE 10 carried by the user 12 in accordance with a cellular communication system.

The UE 20 is a communication device that is mounted on the vehicle 22 and moves as the vehicle 22 travels. The UE 20 has a function of communicating with the eNB 30 in accordance with control by the eNB 30. Furthermore, the UE 20 has a function of receiving the GNSS signal transmitted from the GNSS satellite 40 and measuring position information of the UE 20 from the navigation message included in the GNSS signal. Furthermore, the UE 20 has a function of communicating with the RSU 50. Moreover, the UE 20 according to the present embodiment can also directly communicate with the UE 10 carried by the user 12 or the UE 20 mounted on another vehicle 22, in other words, perform D2D communication such as the sidelink. In the following, in a case where it is not necessary to distinguish the UE 20 and the mobile body 22 in particular, they are collectively referred to as the UE 20.

The UE 10 is a communication device that is carried by the user 12 and moves as the user 12 walks and runs, or as a vehicle (a bus, a motorcycle, a vehicle, or the like) moves that the user 12 rides. The UE 10 has a function of communicating with the eNB 30 in accordance with control by the eNB 30. Furthermore, the UE 10 has a function of receiving the GNSS signal transmitted from the GNSS satellite 40 and measuring position information of the UE 10 from the navigation message included in the GNSS signal. Furthermore, the UE 10 has a function of communicating with the RSU 50. Moreover, in the present embodiment, the UE 10 can also directly communicate with another UE 10 or the UE 20, in other words, perform D2D communication such as the sidelink. Communication between the UE 10 and the UE 20 is also V2P communication.

Note that, in FIG. 7, the vehicle 22 is illustrated as an example of the mobile body, but the mobile body is not limited to the vehicle 22. For example, the mobile body may be a ship, an aircraft, a bicycle, or the like. Furthermore, in the above description, it has been described that the UE 20 has a function of receiving the GNSS signal; however, the vehicle 22 may have a function of receiving the GNSS signal, and the vehicle 22 may output a reception result of the GNSS signal to the UE 20.

Figure 8:
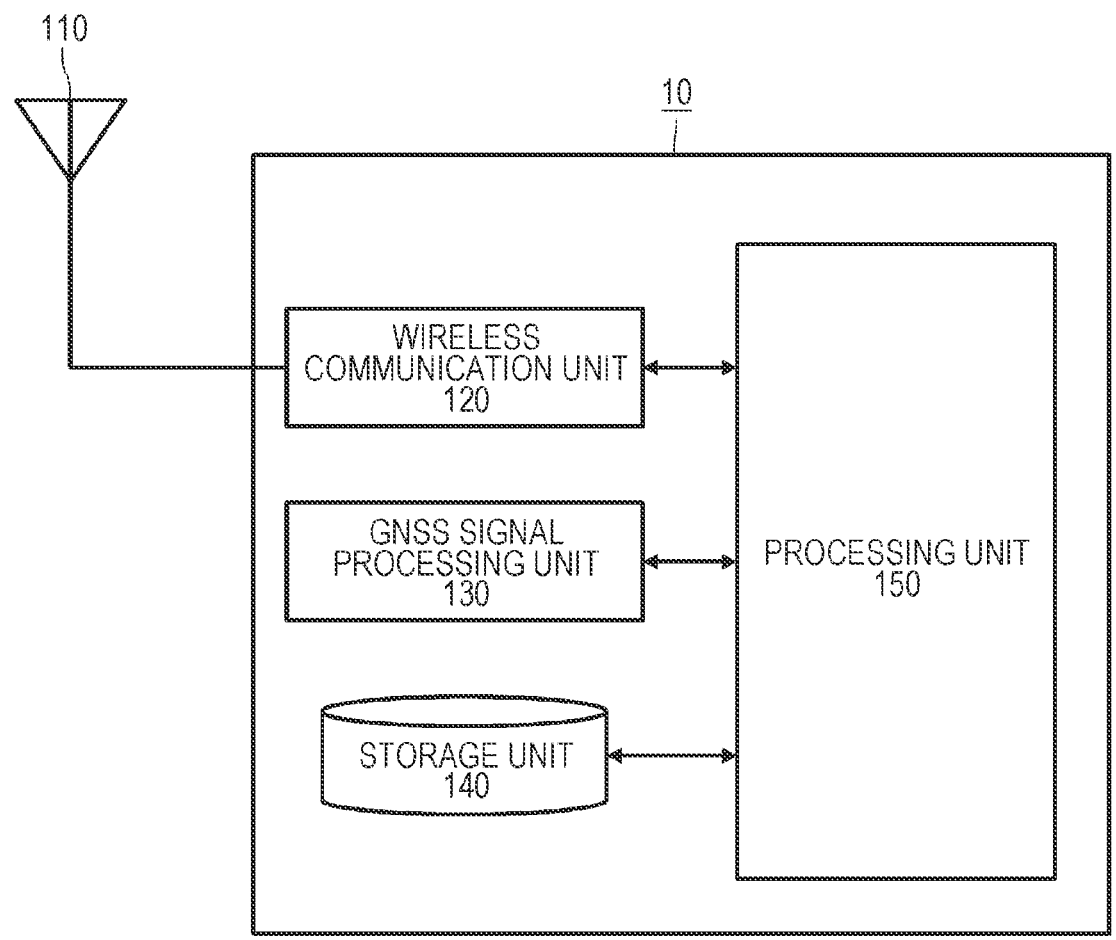
FIG. 8 is a diagram schematically illustrating a functional configuration example of a communication device (UE) carried by a user.

FIG. 8 schematically illustrates a functional configuration example of the communication device. The communication device illustrated in FIG. 8 corresponds to, for example, the UE 10 carried by the user 12 in the wireless communication system illustrated in FIG. 7. Furthermore, the communication device illustrated in FIG. 8 also operates as a relay terminal that performs sidelink relay communication.

As illustrated in FIG. 8, the UE 10 includes an antenna unit 110, a wireless communication unit 120, a GNSS signal processing unit 130, a storage unit 140, and a processing unit 150.

The antenna unit 110 radiates a signal output from the wireless communication unit 120 into space as a radio wave. Furthermore, the antenna unit 110 converts a radio wave in the space into a signal and outputs the signal to the wireless communication unit 120.

The wireless communication unit 120 transmits and receives signals. For example, the wireless communication unit 120 receives a downlink signal from the eNB 30 and transmits an uplink signal to the eNB 30. Furthermore, the wireless communication unit 120 transmits and receives sidelink signals to and from another UE 10, the UE 20, or the RSU 50.

The GNSS signal processing unit 130 is configured to perform processing on the GNSS signal transmitted from the GNSS satellite 10. For example, the GNSS signal processing unit 130 measures the position information and time information of the UE 10 by processing the GNSS signal.

The storage unit 140 temporarily or non-volatilely stores a program and various data for operation of the UE 10.

The processing unit 150 provides various functions of the UE 10. For example, the processing unit 150 controls communication performed by the wireless communication unit 120. It is assumed that the communication operation of the UE 10 as a relay terminal in sidelink relay communication described later is basically realized by the control of the processing unit 150.

Figure 9:
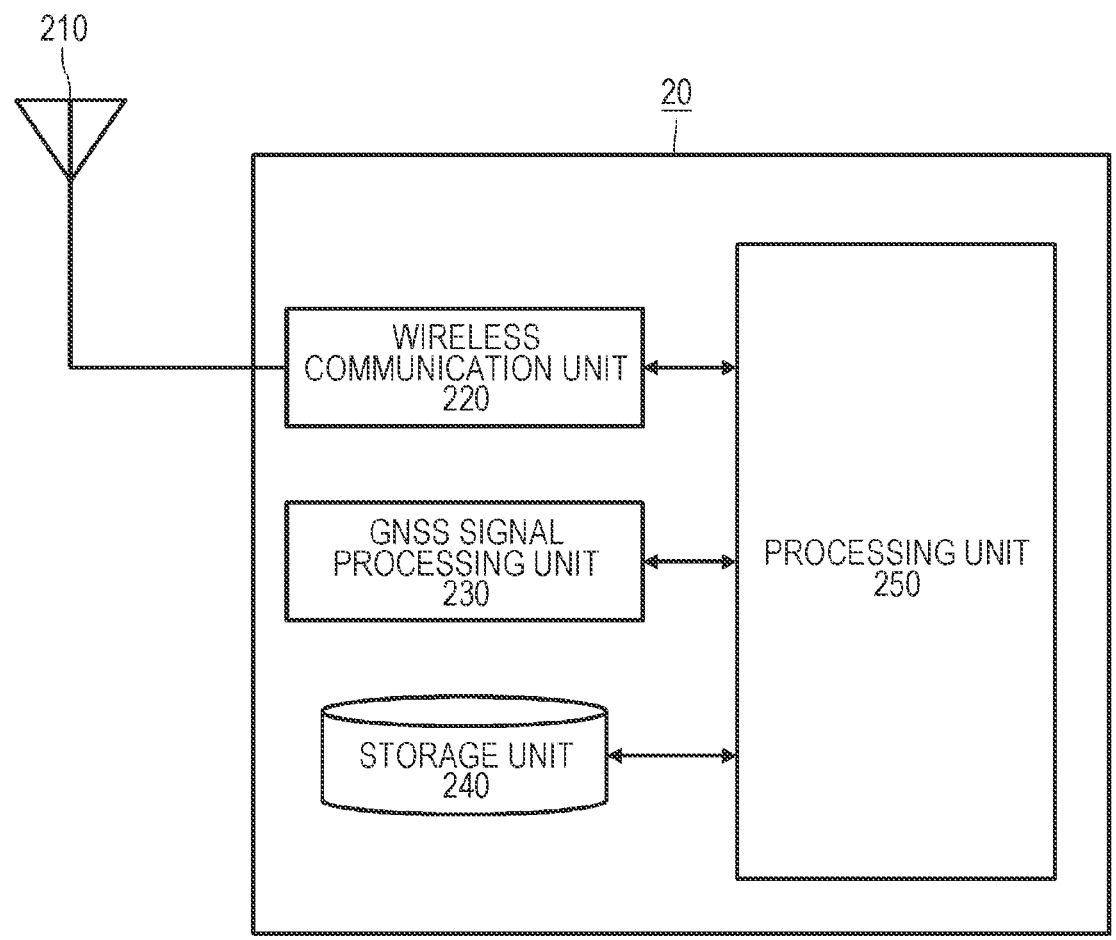
FIG. 9 is a diagram schematically illustrating a functional configuration example of a communication device (UE) used by being mounted on a mobile body such as a vehicle.

FIG. 9 schematically illustrates a functional configuration example of the communication device used by being mounted on a mobile body such as a vehicle. The communication device illustrated in FIG. 9 corresponds to, for example, the UE 20 mounted on the vehicle 22 in the wireless communication system illustrated in FIG. 7. Furthermore, the communication device illustrated in FIG. 9 also operates as a relay terminal that performs sidelink relay communication.

As illustrated in FIG. 9, the UE 20 includes an antenna unit 210, a wireless communication unit 220, a GNSS signal processing unit 230, a storage unit 240, and a processing unit 250.

The antenna unit 210 radiates a signal output from the wireless communication unit 220 into space as a radio wave. Furthermore, the antenna unit 210 converts a radio wave in the space into a signal and outputs the signal to the wireless communication unit 220.

The wireless communication unit 220 transmits and receives signals. For example, the wireless communication unit 220 receives a downlink signal from the eNB 30 and transmits an uplink signal to the eNB 30. Furthermore, the wireless communication unit 220 transmits and receives sidelink signals to and from the UE 10, another UE 20, or the RSU 50.

The GNSS signal processing unit 230 is configured to perform processing on the GNSS signal transmitted from the GNSS satellite 40. For example, the GNSS signal processing unit 230 measures the position information and time information of the UE 20 by processing the GNSS signal.

The storage unit 240 temporarily or non-volatilely stores a program and various data for operation of the UE 20.

The processing unit 250 provides various functions of the UE 20. For example, the processing unit 250 controls communication performed by the wireless communication unit 220. It is assumed that the communication operation of the UE 20 as a relay terminal in sidelink relay communication described later is basically realized by the control of the processing unit 250.

Figure 10:
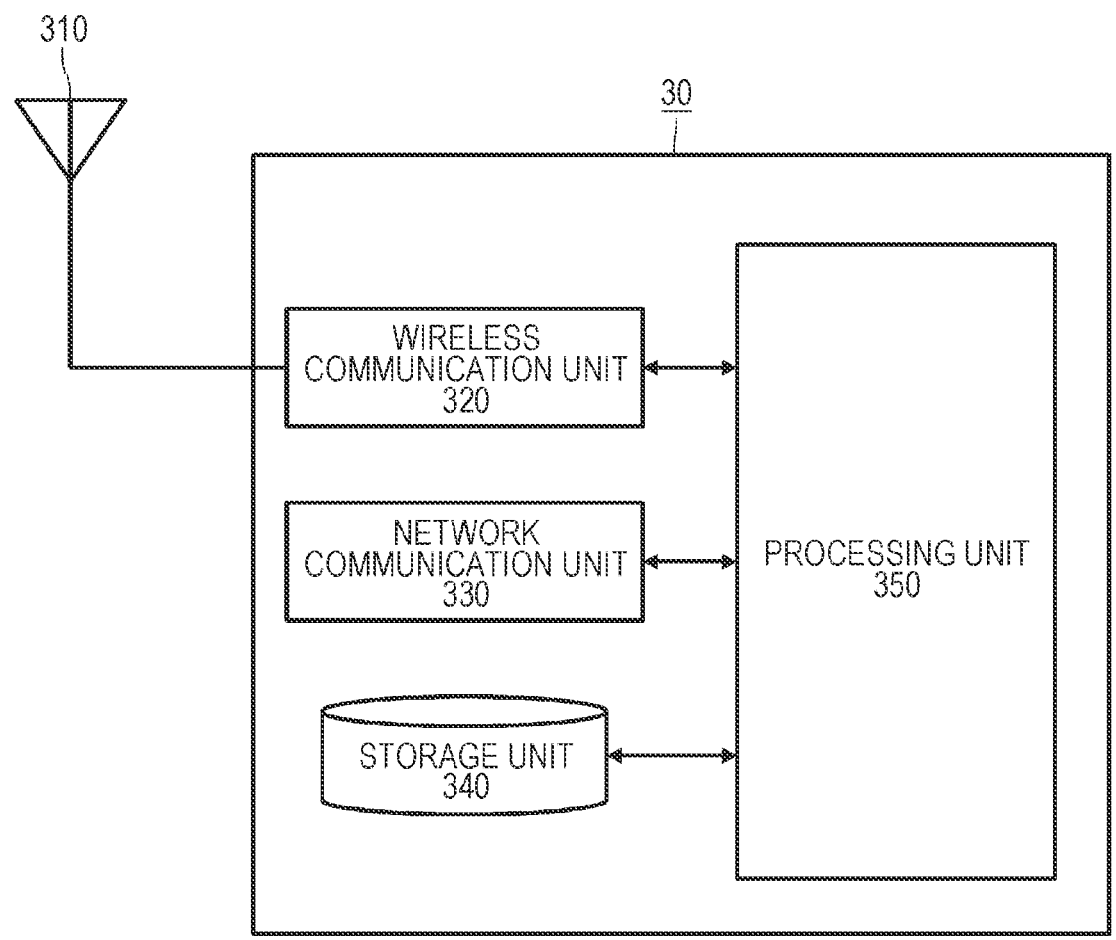
FIG. 10 is a diagram schematically illustrating a functional configuration example of a communication device that operates as a base station (E-UTRAN, eNB).

Furthermore, FIG. 10 schematically illustrates a functional configuration example of a communication device that mainly operates as a base station. The communication device illustrated in FIG. 10 corresponds to, for example, the E-UTRAN in the V2V communication environment illustrated in FIGS. 2 to 6, or the eNB 30 in the wireless communication system illustrated in FIG. 7.

As illustrated in FIG. 10, the eNB 30 includes an antenna unit 310, a wireless communication unit 320, a network communication unit 330, a storage unit 340, and a processing unit 350.

The antenna unit 310 radiates a signal output from the wireless communication unit 320 to space as a radio wave. Furthermore, the antenna unit 310 converts a radio wave in the space into a signal and outputs the signal to the wireless communication unit 320.

The wireless communication unit 320 transmits and receives signals. For example, the wireless communication unit 320 receives an uplink signal from the UE 10, UE 20, or RSU 50, and transmits a downlink signal to the UE 10, UE 20, or RSU 50.

The network communication unit 330 transmits and receives information via a network (not illustrated). For example, the network communication unit 330 transmits information to other nodes and receives information from other nodes. The other nodes mentioned here include other base stations and core network nodes.

The storage unit 340 temporarily or non-volatilely stores a program and various data for operation of the eNB 30.

The processing unit 350 provides various functions of the eNB 30. For example, the processing unit 350 controls communication performed by subordinate user terminals (the UE 10, the UE 20) and the RSU 50.

Furthermore, in the present embodiment, the processing unit 350 may determine whether or not the subordinate user terminals (the UE 10, the UE 20), the RSU 50, and the like perform relay as relay terminals in sidelink relay communication, and perform processing of notifying each terminal of the determination result.

Figure 11:
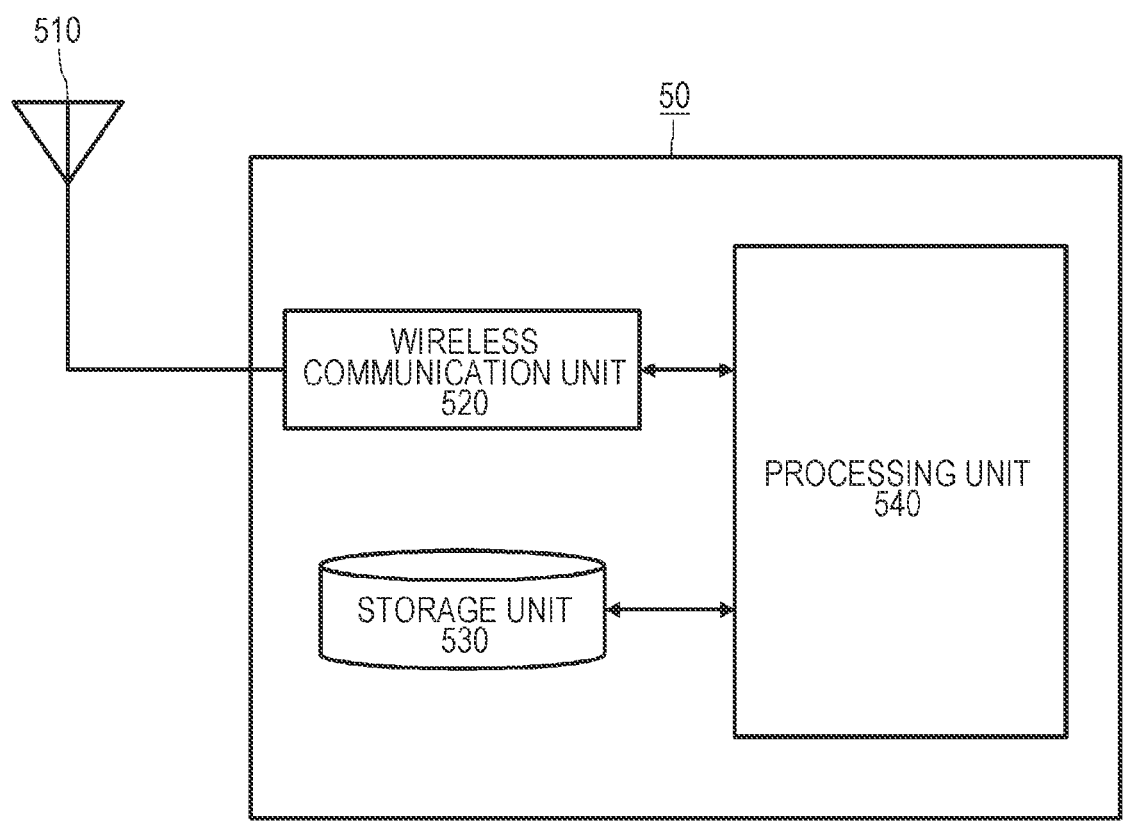
FIG. 11 is a diagram schematically illustrating a functional configuration example of a communication device that operates as an RSU.

FIG. 11 schematically illustrates a functional configuration example of a communication device used as the RSU 50 in the wireless communication system illustrated in FIG. 7. As illustrated, the RSU 50 includes an antenna unit 510, a wireless communication unit 520, a storage unit 530, and a processing unit 540.

The antenna unit 510 radiates a signal output from the wireless communication unit 520 to space as a radio wave. Furthermore, the antenna unit 510 converts a radio wave in the space into a signal and outputs the signal to the wireless communication unit 520.

The wireless communication unit 520 transmits and receives signals. For example, the wireless communication unit 520 receives a downlink signal from the eNB 30 and transmits an uplink signal to the eNB 30. Furthermore, the wireless communication unit 520 transmits and receives sidelink signals to and from the UE 10, the UE 20, or another RSU 50.

The storage unit 530 temporarily or non-volatilely stores a program and various data for operation of the RSU 50.

The processing unit 540 provides various functions of the RSU 50. For example, the processing unit 540 controls communication performed by the wireless communication unit 520. It is assumed that the communication operation of the RSU 50 as a relay terminal in sidelink relay communication described later is basically realized by the control of the processing unit 540.

B. Sidelink Relay Communication

In eV2X communication, it is assumed to use a high frequency called millimeter wave of higher than or equal to 6 GHZ (described above). A high frequency signal has high straightness and a high distance attenuation. For this reason, assuming a communication environment for automobiles, it becomes difficult to secure line-of-sight communication in V2X communication (in particular, V2V communication or V2P communication) at intersections or when vehicles are congested.

Thus, in this specification, such a problem is solved by focusing on relay communication between terminals or sidelink relay communication among enhancements of the physical layer of eV2X communication.

B-1. Assumed Scenario of V2X Relay Communication

Figure 12:
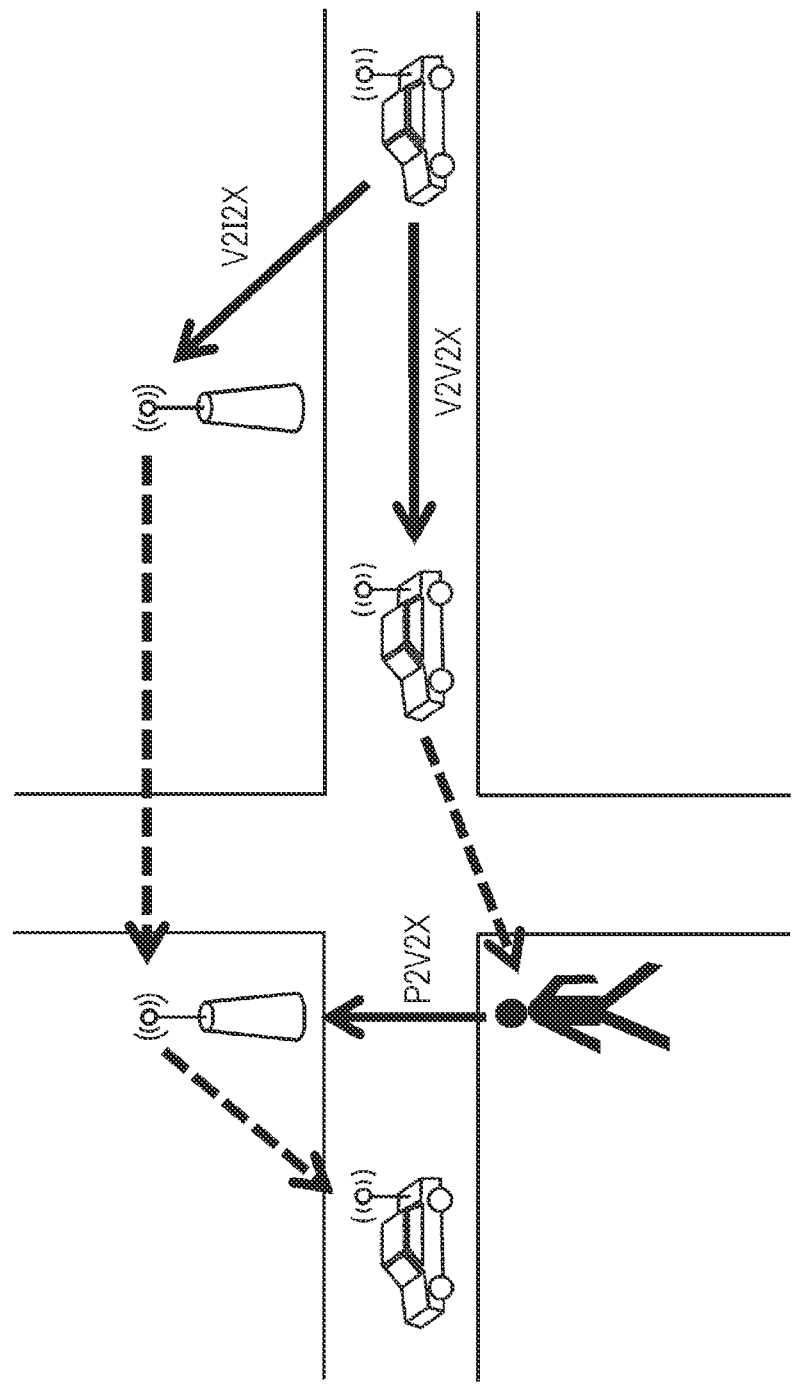
FIG. 12 is a diagram exemplifying a scenario assumed in V2X relay communication.

FIG. 12 exemplifies a scenario assumed in V2X relay communication. A main deployment of V2X relay communication (combination of V, I (N), P, . . . ) is as illustrated below. For example, it is assumed that a high frequency of higher than or equal to 6 GHz is used for communication between terminals.

Figure 13:
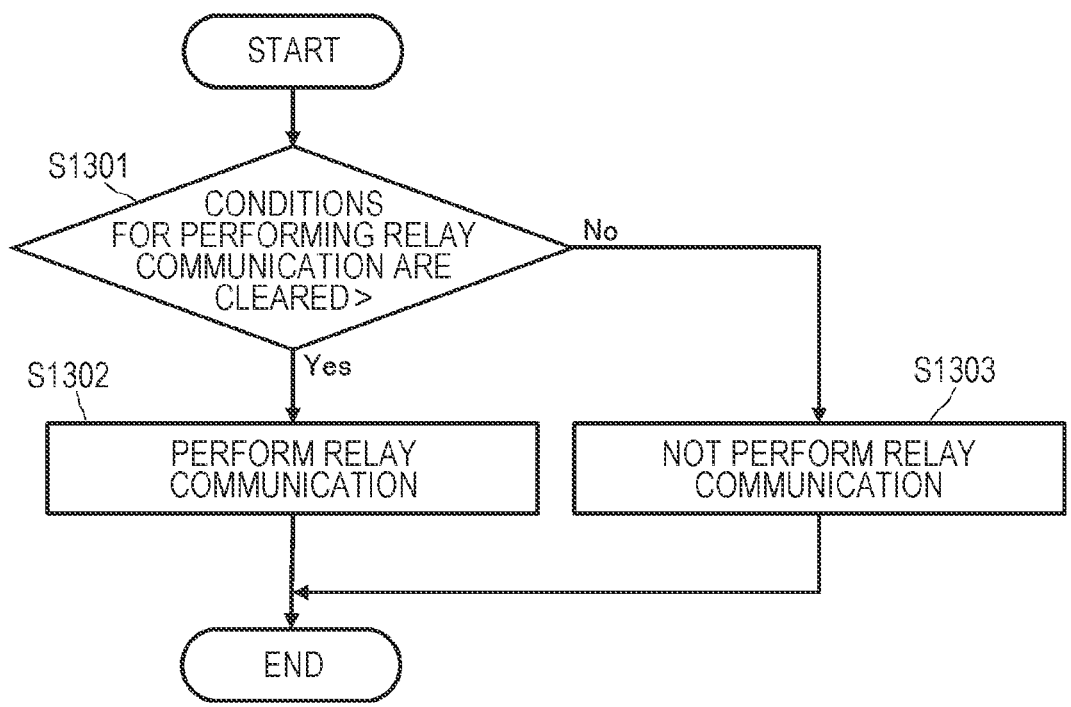
FIG. 13 is a flowchart illustrating a processing procedure performed when a terminal receives a signal.

V2V2X communication—vehicle<=>vehicle
I2I2X communication—infrastructure<=>infrastructure
P2P2X communication—pedestrian<=>pedestrian
V2I2X communication (including I2V2X)—vehicle<=>infrastructure.
P2I2X communication (including P2V2X)—pedestrian<=>infrastructure
P2V2X communication (including V2P2X)—pedestrian<=>vehicle B-2. Application Determination Processing for V2X Relay Communication Each terminal illustrated in FIG. 12 determines whether or not to perform relay communication when receiving a signal. FIG. 13 illustrates a processing procedure performed when a terminal receives a signal in the form of a flowchart. The terminal mentioned here may be a vehicle, an infrastructure such as an RSU, or a vulnerable user such as a pedestrian terminal. In other words, the relay terminal corresponds to the communication device illustrated in FIG. 8, 9, or 11.

When receiving the signal, the terminal checks whether or not conditions for performing relay communication are cleared (step S1301). Then, only in a case where the conditions for performing relay communication are cleared (Yes in step S1301), relay communication is performed (step S1302). In other cases (No in step S1301), relay communication is not performed (step S1303).

In step S1301, it is determined whether or not the conditions for performing relay communication are cleared, by using information as described below.

(1) Information received from base station.
  Instruction information or control information from base station
  Information provided by base station
(2) Information received from terminal (V/I/P terminal) other than relay terminal
(3) Information obtained by relay terminal itself As for a determination criterion for determining whether or not the information as described above clears the conditions for performing relay communication, different rules may be set depending on, for example, terminal types. For example, different criteria may be respectively set for the RSU and vehicle. In the following, details will be described of each condition for performing relay communication.

B-3. Information Received from Base Station
B-3-1. Instruction Information or Control Information from Base Station In some cases, implementation determination of relay communication is performed in a base station or an application layer, and the terminal is notified of the determination result. The instruction information or control information from the base station corresponds to a notification of the implementation determination result of relay communication.

B-3-1-1. Information Used for Determination of Relay Communication Implementation In the base station and the application layer, for example, the following conditions (1) to (8) are used to determine whether or not the terminal performs relay communication. Note that, examples of the application layer mentioned here include, for example, an Intelligent Transport Systems (ITS) application server, a V2X function server, and the like.
(1) Terminal position information
(2) Line-of-sight state of communication in terminal
(3) Allocated frequency, operating frequency
(4) Amount of (available) resources allocated to V2X communication (5) Amount of interference from other systems (6) Reference Signal Received Power (RSRP), Received Signal Strength Indicator (RSSI), or Reference Signal Received Quality (RSRQ) information for sidelink in terminal (7) Terminal category, terminal capability (8) Operation time zone The base station can point to the information as described in (1) to (8) above by a function as an administrator. As for the amount of interference of (5) among the above, information reported from the terminal may be used, or the base station may measure the amount.

The base station can perform implementation determination of relay communication by the terminal on the basis of information regarding the area of the terminal, such as (1) and (2) above. Furthermore, the base station can perform implementation determination of relay communication by the terminal on the basis of information regarding the margin of resources that can be used by the terminal, such as (3) and (4) above (when the channel is congested, the amount of resources allocated to the terminal is reduced inevitably). Furthermore, the base station can perform implementation determination of relay communication by the terminal on the basis of information regarding the channel state of the terminal or the congestion level of the channel, such as (5) and (6) above. Furthermore, the base station can perform implementation determination of relay communication by the terminal on the basis of information regarding the specification of the terminal, such as (7) above. Furthermore, the base station may switch the criterion for implementation determination of relay communication by the terminal depending on the operation time zone.

B-3-1-2. Method of Notification of Determination Result of Relay Communication Implementation Then, when the base station performs determination of terminal relay communication implementation by using, for example, the above conditions (1) to (8), the base station notifies the terminal of Enable/Disable of the relay communication. The terminal performs relay communication when Enable is received from the base station, and stops performing relay communication when Disable is received from the base station.

Several methods can be considered for notifying the terminal of Enable/Disable from the base station. In the following, description will be given of three methods, a method of notification through Radio Resource Control (RRC) signaling, a method of broadcasting as system information, and a method of controlling implementation of relay communication implicitly.

(1) Method of Notification Using RRC Signaling

For example, the base station may configure each terminal through RRC signaling. The terminal instructed to perform relay communication by the base station operates as a relay terminal and performs relay communication.

(2) Method of Broadcasting as System Information

Furthermore, the base station may broadcast notification of Enable/Disable of relay communication, as system information such as System Information Block (SIB). For example, the base station may notify the terminal of availability of relay communication as attribute information of the resource pool for the sidelink. Notification may be performed of attribute information, such as that relay communication is always performed in a specific area in the resource pool, as system information. Furthermore, notification may be performed of the availability of relay communication in association with the frequency band used for the sidelink. For example, the notification is preconfigured as carrier specific information in the terminal.

(3) Method of Implicit Notification

The base station may perform control of relay communication implicitly by a resource allocation method at the time of resource allocation to the terminal. That is, the terminal determines to perform relay communication at the time when a resource for relay communication is allocated by the base station.

Note that, in the 3GPP standard TS 36.213, mode 1 and mode 3 are standardized as resource allocation methods for the sidelink by the base station. In mode 3, resources are allocated semi-statically, but resource allocation in mode 1 is not semi-static. Thus, the terminal can perform implicit relay communication control as described above at the time of resource allocation in mode 3.

B-3-2. Information Provided by Base Station

For example, the following (1) to (5) can be mentioned as information provided from the base station to determine implementation of relay communication in the terminal. Then, the base station can perform notification of such information through RRC signaling, or as system information (SIB or the like), similarly to the case of instruction information or control information.

(1) Channel Congestion Level of Sidelink

Information such as a Channel Busy Ratio (CBR) and a Channel Occupancy Ration (CR) may be calculated on the base station side. The base station provides the terminal with the information of the CBR and CR, and the terminal side can determine implementation of relay communication on the basis of such information. For example, when it is indicated that the channel is congested, the relay terminal may suppress implementation of relay communication in consideration of congestion prevention on the sidelink.

(2) Information on Area in which Relay Communication should be Performed

The base station provides the terminal with information on an area in which relay communication should be performed or information on an area in which relay communication may be performed. The information on the area mentioned here is geographical information. Thus, the Information on the area may be indicated by coordinates, or may be indicated as information on a certain section such as a zone.

(3) Number of Transmission Terminals

The base station notifies the terminal of the number of transmission terminals existing in a predetermined resource pool. The number of transmission terminals can be used as an index of the degree of congestion in the predetermined resource pool. Thus, when the received number of transmission terminals is large, the terminal may suppress implementation of relay communication to prevent congestion in the resource pool.

(4) Number of Allocated Resources

The base station notifies the terminal of a ratio of the amount of resources allocated by the base station in the predetermined resource pool. The number of allocated resources can be used as an index of the degree of congestion in the predetermined resource pool. Thus, when the received number of allocated resources is large, the terminal may actively perform relay communication because the resource pool is considered to have a margin.

(5) Distance from Base Station

The base station notifies the terminal of a distance between the terminal and the base station. A terminal far from the base station is likely to have an out-of-coverage area in the vicinity. Thus, when a long distance to the base station is received, the terminal may determine to perform relay communication to support the terminal in the out-of-coverage area. Note that, distance measurement may be performed by using position information such as the Global Positioning System (GPS) or GNSS. Alternatively, the distance to the base station may be estimated by using RSRP measurement or the like.

In summary, the base station can provide the terminal with three types of information, relay instruction, information on the area, and a congestion level of the sidelink (channel).

B-4. Information Received from Terminal (V/I/P/N Terminal) Other than Relay Terminal The terminal may perform implementation determination of relay communication by using information obtained from other terminals. The other terminals mentioned here are terminals other than the base station (eNB or E-UTRAN), and terminals are assumed such as a vehicle, infrastructure (RSU), and pedestrian. Communication between these other terminals and the relay terminal is basically performed by using the sidelink. However, a communication link via eNB may be used.

Information obtained from the other terminals can be divided into information obtained from a transmission source terminal that has transmitted a packet to a relay terminal, and information obtained from a terminal other than the relay terminal (not limited to the transmission source terminal). In the following, the information obtained from each will be described.

B-4-1. Information Obtained from Transmission Source Terminal that has Transmitted Packet to Relay Terminal For example, the following (1) to (7) can be mentioned as information obtained from the transmission source terminal of a packet. The transmission source terminal can provide information to the relay terminal by describing the information in Sidelink Control Information (SCI), or Media Access Control (MAC) header of the packet.

(1) Information Regarding Necessity of Relay Communication for Transmitted Packet The transmission source terminal may describe information regarding implementation of relay communication in the SCI or the MAC header of the packet. A plurality of levels may be defined regarding necessity of relay communication, and the transmission source terminal may describe a level according to the necessity of relay communication implementation for a transmission packet in the SCI or MAC header.

Furthermore, the transmission source terminal may specify the effective time, effective range, effective number of hops, and the like of the transmission packet together with information regarding the necessity of relay communication.

Furthermore, the transmission source terminal may perform notification of a condition under which the transmission packet should be relayed (or a condition under which the transmission packet should not be relayed), instead of directly indicating information regarding the necessity of relay communication. The relay terminal performs implementation determination of relay communication for the packet on the basis of the condition received with the transmission packet. Furthermore, every time the condition is received with the transmission packet, the relay terminal sequentially updates the condition for implementation determination of relay communication. For example, the transmission source terminal may describe the following conditions in the SCI or MAC header.

In a case where a packet with the same packet ID is received from another terminal, relay should not be performed. Suppressing relay communication also prevents packet flooding.

In a case where an ACK signal with the same packet ID is received from another terminal, relay should not be performed. Suppressing relay communication also prevents packet flooding.

In a case where a NACK signal with the same packet ID is received from another terminal, relay should be performed. Performing relay communication for a packet that fails to be transmitted or received leads to improvement of system reliability.

The relay terminal may determine whether or not the received packet should be relayed, by using attribute information of the packet, such as broadcast or unicast. The transmission source terminal describes information such as the packet type in the SCI. Furthermore, the transmission source terminal may implicitly indicate necessity of relay communication by using destination information described in the SCI. Alternatively, the relay terminal may implicitly perform implementation determination of relay communication on the basis of the destination information described in the SCI. For example, in a case where only one piece of destination information is included, the relay terminal determines that it is unicast and does not perform relay communication, but in a case where there is no destination information, the relay terminal may determine that the information is broadcast and perform relay communication.

(2) Priority Information of Packet

The transmission source terminal describes priority information of the transmission packet in, for example, the SCI or the MAC header of the packet. The priority information described in the 3GPP standard TS 36.213 may be used. Although the priority information of the standard does not originally define priority of relay communication, it can be said that a high priority packet such as a safety packet should be preferentially subjected to relay communication.

(3) Number of Relay Hops of Packet

The transmission source terminal describes the number of hops of the transmission packet in, for example, the SCI or the MAC header of the packet.

(4) Relay Path of Packet

The transmission source terminal describes a relay path of the transmission packet in, for example, the SCI or the MAC header of the packet. For example, it is indicated that the path is which one of V/I/P/N. Furthermore, the relay time of the packet may be described together.

(5) Resource Allocation Mode Information of Packet

The transmission source terminal describes resource allocation mode information of a resource secured for the transmission packet and a resource reserved for relay communication in, for example, the SCI or the MAC header of the packet. In the 3GPP standard TS 36.213, mode 1 and mode 3 are described as resource allocation methods for the sidelink by the base station, and mode 2 and mode 4 are standardized as resource allocation methods for the sidelink by the terminal. Resource allocation in mode 3 is semi-static, whereas resource allocation in mode 1 is not semi-static. Furthermore, the terminal performs sensing to secure a resource in mode 4, whereas the terminal secures resources without sensing in mode 2, so that there is a possibility of collision. For example, if a reserved relay communication resource is in mode 2, there is a possibility of collision, so that relay communication is not performed; however, if the reserved relay communication resource is in mode 1, there is a low possibility of collision, so that implementation of relay communication may be determined.

(6) Generation Time and Transmission Time of Packet

The transmission source terminal describes generation time and transmission time of the transmission packet in, for example, the SCI or the MAC header of the packet.

(7) Generation Area and Transmission Area of Packet

The transmission source terminal describes information on a generation area and a transmission area of the transmission packet in, for example, the SCI or the MAC header of the packet. The area mentioned here is geographical information, which may be indicated by coordinates, or may be indicated as information on a certain section such as a zone.

Note that, the information of (3) to (7) above can also be referred to as information indicating "freshness" of the packet. For example, freshness information of the packet is defined by combining two or more parameters of (2) to (7) above, and the transmission source terminal describes the freshness information in, for example, the SCI or the MAC header of the packet. A calculation formula for deriving the freshness information from the parameters regarding the packet may be set by the base station, or pre-configuration may be performed in each user terminal. In the field of information technology, it can be said that the higher the freshness, the more meaningful it is. A packet with high freshness is defined as having high information entropy, for example (information with lower probability indicates higher entropy). Thus, the relay terminal can relay a packet having more meaningful information by performing implementation determination of relay communication of the packet on the basis of the freshness information or the information entropy.

Note that, a calculation formula for deriving the freshness information from the parameters of (3) to (7) above may be set by the base station, or pre-configuration may be performed in each user terminal. For example, notification of such a calculation formula is performed from the base station to the user terminal, as RRC signaling or system information (SIB).

B-4-2 Information Obtained from Other than Relay Terminal

As information obtained from other than the relay terminal, for example, information can be mentioned indicating the channel status of the sidelink, such as the following (1) to (3). The terminals other than the relay terminal mentioned here include a transmission source terminal that has transmitted a packet to the relay terminal, and a terminal other than the relay terminal that is not the transmission source terminal.

(1) Channel Congestion Level of Sidelink

Information such as the CBR and CR measured by terminals other than the relay terminal is shared by the relay terminal on the sidelink. For example, when it is indicated that the channel is congested, the relay terminal may suppress implementation of relay communication in consideration of congestion prevention.

(2) Channel State of Sidelink

Information such as RSRP, RSSI, and RSRQ is received from terminals other than the relay terminal. The information may be received including position information of a measurer terminal. For example, if the channel is congested, the received power, that is, RSSI increases, so that the relay terminal may determine not to perform relay communication.

(3) ACK/NACK Information in Other Terminals

Statistical information of ACK/NACK of the packet transmitted so far and the like is received from the terminals other than the relay terminal. For example, in an area in which a ratio of NACK is greater than or equal to a predetermined threshold value, communication is not established, so that it is determined that relay communication is to be performed. Alternatively, since it is estimated that the channel is congested in the area in which the ratio of NACK is greater than or equal to the predetermined threshold value, it can also be determined not to perform relay communication.

B-5. Information Obtained by Relay Terminal Itself

As information obtained from the relay terminal itself, for example, information can be mentioned, such as the following (1) to (4).

(1) Channel Congestion Level and Occupancy of Sidelink

The relay terminal itself measures information such as the CBR and CR. For example, when it is indicated that the channel is congested, the relay terminal may suppress implementation of relay communication in consideration of congestion prevention on the sidelink.

(2) Channel State of Sidelink

The relay terminal itself measures the channel state in the sidelink such as the RSRP, RSSI, and RSRQ. For example, if the channel is congested, the received power, that is, RSSI increases, so that the relay terminal may determine not to perform relay communication.

(3) ACK/NACK Information

Information of ACK/NACK of packets transmitted from other terminals is decoded by the relay terminal itself. For example, in an area in which a ratio of NACK is greater than or equal to a predetermined threshold value, communication is not established, so that the relay terminal determines to perform relay communication. Alternatively, since it is estimated that the channel is congested in the area in which the ratio of NACK is greater than or equal to the predetermined threshold value, the relay terminal can also determine not to perform relay communication.

(4) Terminal Position Information

For example, the position information of the relay terminal itself is measured by using position information such as the GPS or GNSS. Then, the relay terminal performs implementation determination of relay communication on the basis of whether or not the relay terminal itself is in an area in which relay communication should be performed or an area in which relay communication may be performed.

B-6. Implementation Determination Processing of Relay Communication

In the above, it has been described that the information used by the relay terminal for implementation determination of relay communication is received from a terminal other than the base station or the relay terminal, or acquired by the relay terminal itself. Furthermore, information acquired by these acquisition methods includes various parameters as described above, and can be summarized in the following (1) to (5).

(1) Relay instruction from base station
(2) Priority of packet
(3) Congestion level of sidelink
(4) Information on area
(5) Freshness of packet Among the above parameters, (1) relay instruction from base station is an absolute instruction, and the relay terminal instructed to perform relay from the base station always performs relay communication. On the other hand, the parameters (2) to (5) are not essential but have a high importance in ascending order. The relay terminal can perform implementation determination of relay communication of a packet, for example, in accordance with a processing procedure illustrated in the form of a flowchart in FIG. 14.

The relay terminal first checks whether or not an instruction of Enable of relay communication has been received from the base station (step S1401). Then, in a case where the instruction of Enable of relay communication has been received from the base station (Yes in step S1401), the relay terminal performs relay communication (step S1402) and ends the processing.

Furthermore, in a case where the relay terminal has not received the relay instruction from the base station (No in step S1401), the relay terminal checks the priority specified by the transmission source terminal for the received packet (step S1403).

Here, in the case of a packet with a high priority (Yes in step S1403), a threshold value TH1 of a lower congestion level is set, and the channel congestion level (CBR or CR) of the sidelink used for relay communication is compared with the threshold value TH1 (step S1404). Furthermore, in a case where the packet has a low priority (No in step S1403), a threshold value TH2 of a higher congestion level is set (where, TH2>TH1), and the channel congestion level (CBR or CR) of the sidelink used for relay communication is compared with the threshold value TH2 (step S1407).

Then, when the channel congestion level (CBR or CR) of the sidelink is less than or equal to the threshold value TH1 (Yes in step S1404) or less than or equal to the threshold value TH2 (Yes in step S1407), it is further checked whether or not the relay terminal is in an area in which relay communication should be performed or an area in which relay communication may be performed (step S1405).

When the relay terminal is in the area in which relay communication should be performed or the area in which relay communication may be performed (Yes in step S1405), the freshness of the packet is checked (step S1406). Then, in a case where the relay terminal is in a state in which relay communication can be performed and the freshness of the packet is good (Yes in step S1406), the relay terminal performs relay communication (step S1402), and ends the processing.

On the other hand, when relay communication is suppressed and the congestion level of the channel should be prevented since the channel congestion level (CBR or CR) of the sidelink used for relay communication exceeds the threshold value TH1 (No in step S1404) or exceeds the threshold value TH2 (No in step S1407), or when the relay terminal is not in the area in which relay communication should be performed or the area in which relay communication may be performed and is not in a situation in which relay communication can be performed (No in step S1405), or when the freshness of the packet falls (No in step S1406) and the necessity for performing relay communication is low, the relay terminal does not perform relay communication (step S1408), and ends the processing.

Figure 14:
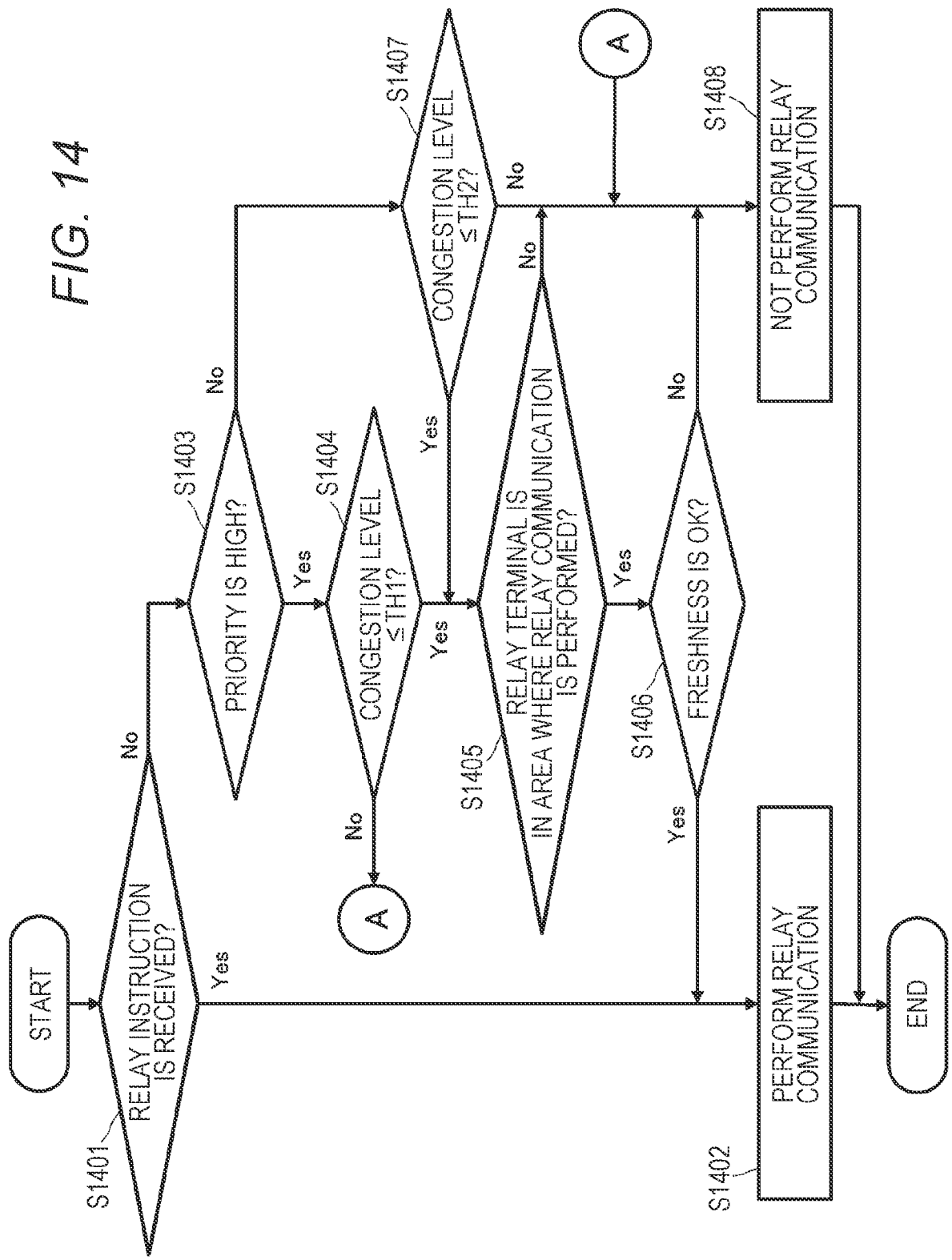
FIG. 14 is a flowchart illustrating a processing procedure in which a relay terminal performs implementation determination of relay communication of a packet.

In the processing procedure of implementation determination illustrated in FIG. 14, steps S1401 and S1403 to S1406 correspond to, for example, the processing performed in step S1301 of the flowchart illustrated in FIG. 13.

However, implementation determination processing of relay communication by the relay terminal is not limited to the processing procedure illustrated in FIG. 14, and is assumed to be appropriately modified or changed depending on the implementation. For example, in the processing procedure illustrated in FIG. 14, the relay terminal determines to always perform relay communication when receiving the instruction of Enable of relay communication from the base station, but the processing procedure is not limited to such determination processing. Determination processing is also assumed such as that in which the relay terminal never performs relay communication when the instruction of Enable of relay communication has not been received from the base station (or an instruction of Disable has been received), or that in which implementation of relay communication is determined depending on other conditions such as the congestion level of the channel and the priority of the packet in a case where the instruction of Enable has been received.

C. Method of Transmitting Relay Packet by Relay Terminal

As described above, the relay terminal performs implementation determination of relay communication when receiving a packet. Then, in a case where it is determined to perform relay communication, the relay terminal performs transmission processing for relay communication.

C-1. Change Parameters

The relay terminal changes the following parameters when performing relay communication.
Resources to be used
Resource pool to be used
Frequency carrier to be used.
Transmission power
Redundancy Version (RV) information
Application of Multiple Input Multiple Output (MIMO), application of beam forming.
Transmission diversity application
Application of Coordinated Multi-point (COMP: multi-point coordination for the purpose of expanding coverage at high data rate and improving throughput at the cell edge)
Packet priority information
Packet information entropy (freshness information)
MA signature C-2. Method of Securing Resource for Relay Communication When the relay terminal determines to perform relay communication, it is necessary to secure a resource to be used for relay communication. Here, a description will be given of a method of securing a resource to be used by the relay terminal for relay communication.

C-2-1. Relay Terminal Itself Secures Resource for Relay Communication

A relay terminal that has determined to perform relay communication secures a resource for relay communication by itself.

The relay terminal performs sensing at the time of transmission of a relay packet, and secures the resource for relay communication.

Furthermore, the relay terminal performs resource selection in consideration of the resource for relay communication, at the time of sensing. That is, the resource is secured by using the priority level given to the resource for relay.

C-2-2. Transmission Source Terminal Reserves Resource for Relay Communication

The nearest transmission source terminal that has transmitted a packet to the relay terminal reserves a resource for relay communication.

The transmission source terminal can include resource reservation information for relay communication in packet control information such as the SCI. The relay terminal can perform relay communication by using a resource for relay communication reserved in advance.

Figure 15:
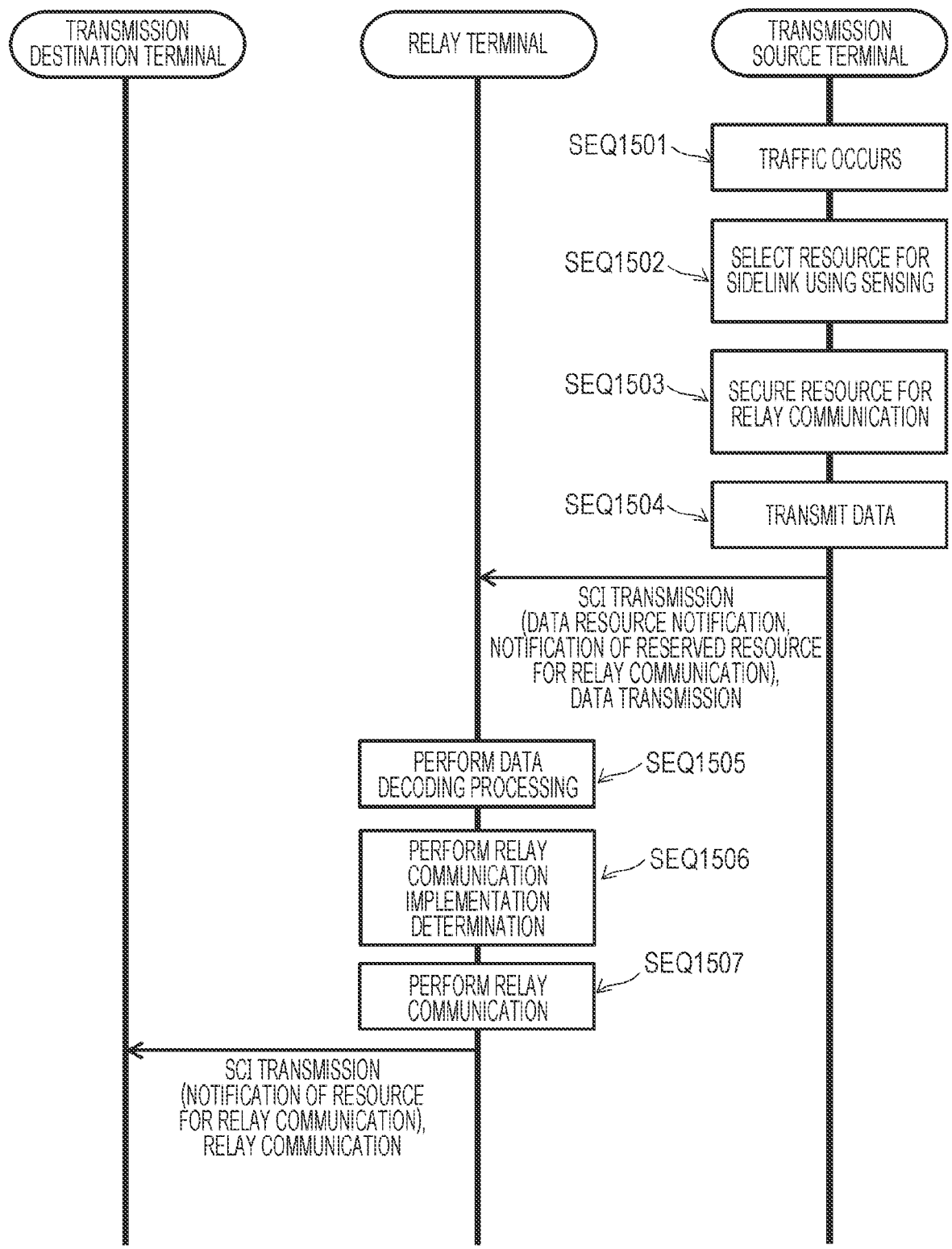
FIG. 15 is a diagram illustrating a communication sequence example in which a transmission source terminal reserves a resource for relay communication and performs relay communication.

FIG. 15 illustrates a communication sequence example in which the transmission source terminal reserves a resource for relay communication and performs relay communication.

When traffic occurs (SEQ1501), the transmission source terminal selects a resource for performing data transmission to the relay terminal by the sidelink by using sensing, from the resource pool for the sidelink (SEQ1502). At this time, the transmission source terminal also selects a resource for relay communication of the relay terminal within the resource pool for the sidelink. In this way, the transmission source terminal secures each of the resource for its own data transmission, and the resource for relay communication of the relay terminal (SEQ1503).

Thereafter, the transmission source terminal uses the packet control information (SCI) to notify the relay terminal of a resource position of the resource for data transmission and reservation information of the resource for relay communication, and then uses the resource received with the SCI to perform data transmission to the relay terminal (SEQ1504).

On the other hand, the relay terminal receives the transmission data from the transmission source terminal at the position of the resource for data transmission indicated by the SCI, to perform decoding processing (SEQ1505). Then, the relay terminal performs implementation determination processing of relay determination illustrated in FIG. 13 or 14, for example (SEQ1506).

Here, for convenience of explanation, it is assumed that the relay terminal determines to perform relay communication. Thus, the relay terminal performs relay communication to a transmission destination terminal by using the resource for relay communication indicated by the SCI from the transmission source terminal (SEQ1507). At this time, the relay terminal notifies the transmission destination terminal of the resource position of the resource for relay communication by using the packet control information (SCI). Furthermore, similarly to the above, the relay terminal may reserve a resource for relay communication for the transmission destination terminal and performs notification together by the SCI.

Furthermore, the transmission source terminal may perform notification of the relay communication resource by using a reservation indicator or the like. Here, the reservation indicator is a bit indicating that, when data is transmitted by using, for example, a certain resource, a resource position separated in the time direction by a predetermined time offset value with a resource for the transmission data as a reference, is reserved for relay communication (in other words, indicating by one bit that the reference resource is repeatedly used).

Figure 16:
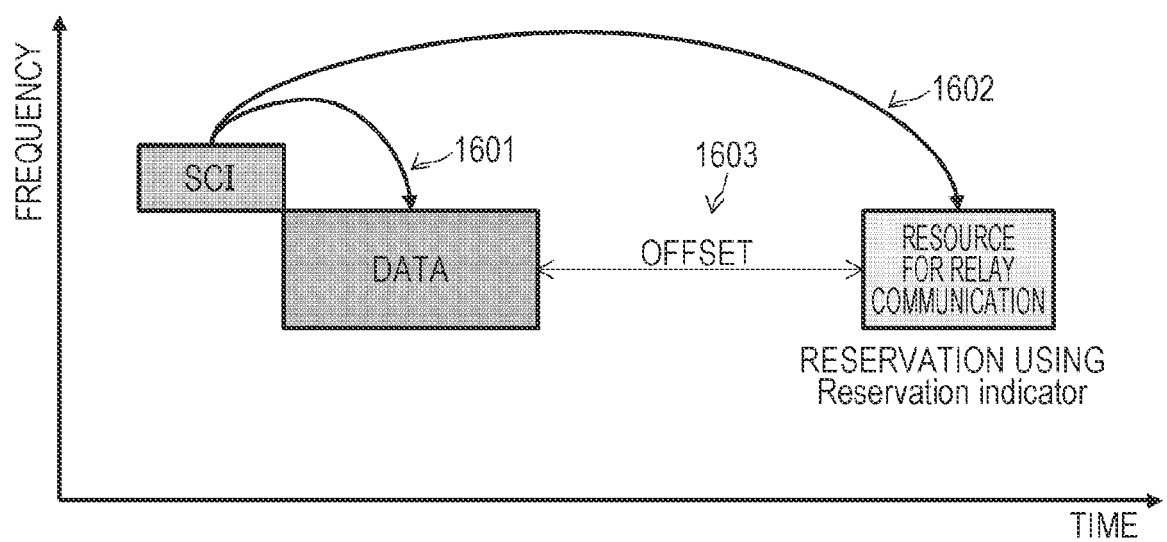
FIG. 16 is a diagram illustrating an allocation example of a resource for relay communication.

FIG. 16 illustrates an allocation example of a resource for relay communication. However, in the figure, the horizontal axis is the time axis, and the vertical axis is the frequency axis. The transmission source terminal transmits the SCI in the sidelink, and then transmits data to the relay terminal. The SCI includes information indicating a time-frequency domain of the data resource indicated by a reference number 1601, and a reservation indicator that is reservation information of the resource for relay communication indicated by a reference number 1602. Furthermore, the time offset value between the resource for data transmission and the resource for relay communication reserved indicated by the SCI, indicated by a reference number 1603, may be a specified value, or may be indicated in the SCI.

C-2-3. Hybrid Method of Securing Resource for Relay Communication

The method of reserving the resource for relay communication by the transmission source terminal and the method of securing the resource for relay communication by the relay terminal itself are combined. Specifically, the relay terminal basically uses the resource for relay communication reserved by the transmission source terminal, but secures the resource for relay communication by itself when the reserved resource cannot be used by re-sensing.

Figure 17:
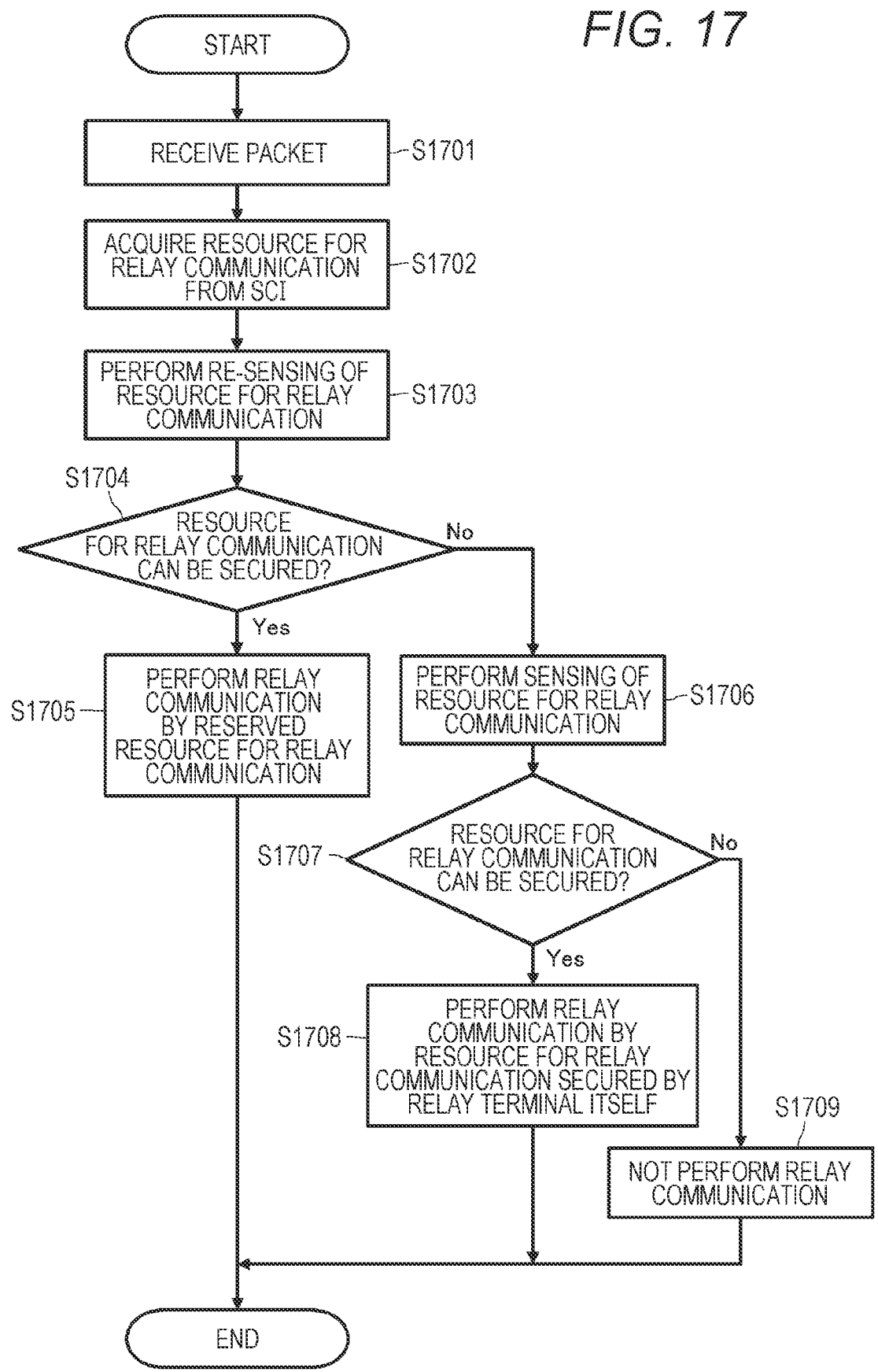
FIG. 17 is a flowchart illustrating a processing procedure for a relay terminal to perform relay communication by a hybrid method of securing a resource for relay communication.

FIG. 17 illustrates a processing procedure for a relay terminal to perform relay communication by a hybrid method of securing a resource for relay communication in the form of a flowchart. The illustrated processing procedure is performed, led by the processing unit 250 of the communication device that operates as a relay terminal.

When the relay terminal receives a data packet from the transmission source terminal (step S1701), the relay terminal performs implementation determination of relay communication. Here, for convenience of explanation, it is assumed that the relay terminal determines to perform relay communication.

Furthermore, the relay terminal acquires position information of a resource reserved for relay communication from the SCI received from a transmission source terminal at the time of data transmission (step S1702).

Next, the relay terminal performs re-sensing of the resource for relay communication acquired from the SCI in step S1702 (step S1703). Then, in a case where re-sensing can be performed of the resource for relay communication acquired in step S1702 (Yes in step S1704), the relay terminal uses the resource for relay communication reserved by the transmission source terminal as it is, and performs relay communication for the packet received in step S1701 (step S1705).

On the other hand, in a case where re-sensing cannot be performed of the resource for relay communication reserved by the transmission source terminal (No in step S1704), the relay terminal performs sensing of the relay communication resource by itself (step S1706).

Here, in a case where the resource for relay communication can be secured by the relay terminal itself (Yes in step S1707), the relay terminal performs relay communication for the packet received in step S1701 by using the resource (step S1708).

Furthermore, in a case where the resource for relay communication cannot be secured by the relay terminal itself (No in step S1707), the relay terminal does not perform relay communication (step S1709).

C-2-4. Method of Securing Resource for Relay Communication by Base Station

The base station may allocate resource for relay communication. For example, notification is performed of Grant (permission) of the allocated resource for relay communication, by Downlink Control Information (DCI) via a Uu link (a wireless section between the base station and the terminal), from the base station to the relay terminal.

Figure 18:
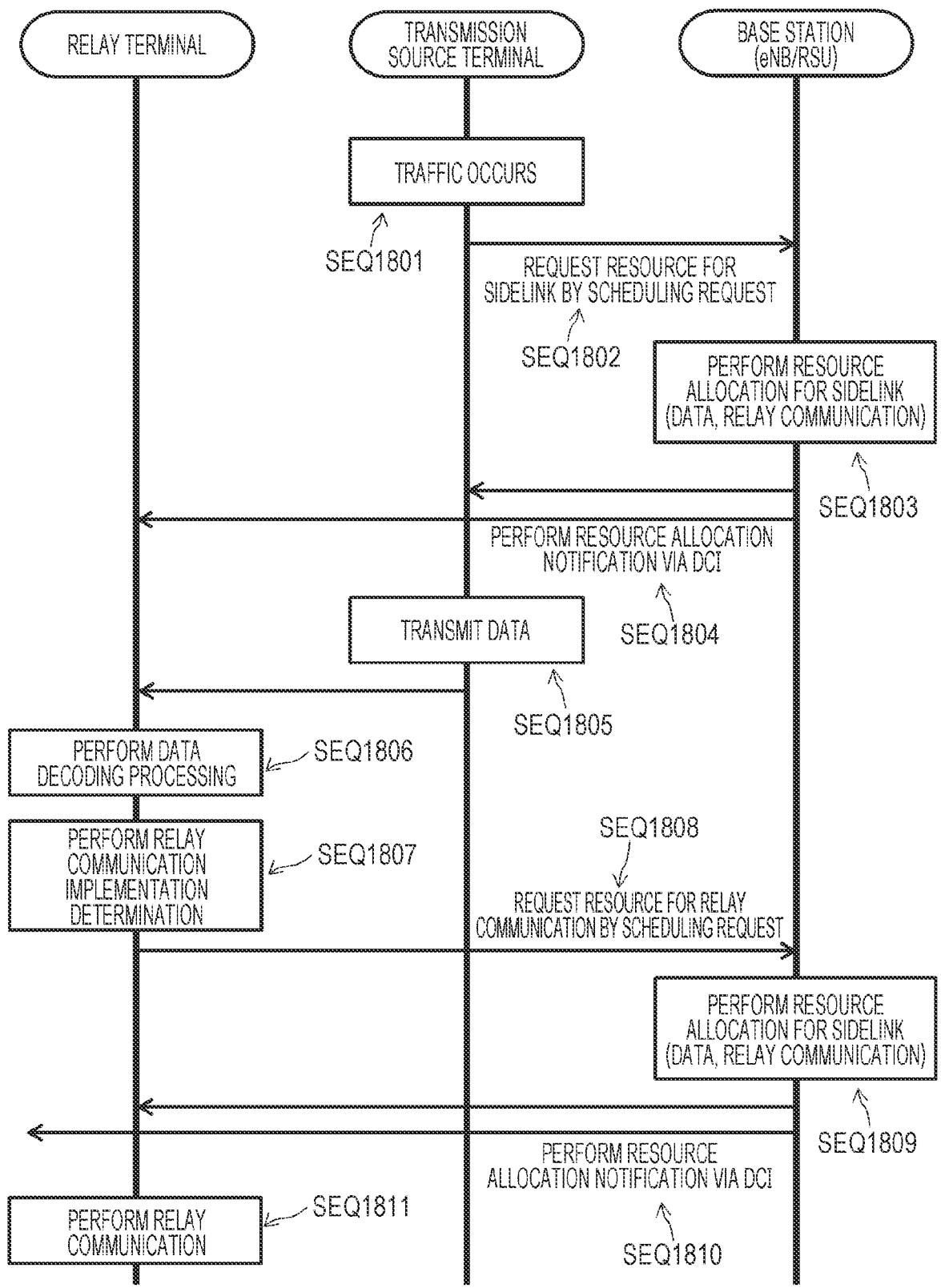
FIG. 18 is a diagram illustrating a communication sequence example in which a base station allocates a resource for relay communication in a sidelink.

FIG. 18 illustrates a communication sequence example in which the base station allocates a resource for relay communication in a sidelink. Note that, the transmission source terminal and the relay terminal in the figure respectively are communication devices (see FIG. 9) mounted on different vehicles, and the base station corresponds to an eNB or RSU (see FIG. 10).

When the traffic occurs (SEQ1801), the transmission source terminal requests a resource for the sidelink by a scheduling request to the connection destination base station (SEQ1802). Here, the transmission source terminal requests a resource for relay communication in addition to the resource for data transmission.

In response to the resource request for the sidelink from the transmission source terminal, the base station allocates the resource for data transmission and the resource for relay communication (SEQ1803). Then, the base station notifies each of the transmission source terminal and the relay terminal of the allocated resource via the DCI (SEQ1804).

Thereafter, the transmission source terminal performs data transmission to the relay terminal by using the resource allocated for data transmission by the sidelink (SEQ1805). On the other hand, the relay terminal receives the transmission data from the transmission source terminal, and performs decoding processing (SEQ1806). Then, the relay terminal performs implementation determination processing of relay determination illustrated in FIG. 13 or 14, for example (SEQ1807).

Here, for convenience of explanation, it is assumed that the relay terminal determines to perform relay communication. The transmission source terminal performs relay communication to a transmission destination terminal (not illustrated) by using the resource allocated for data transmission by the sidelink (SEQ1811).

Note that, in the relay communication, the relay terminal may request a next resource for relay communication to the base station similarly to the above (SEQ1808). In this case, when the base station allocates the resource for relay communication in response to the resource request from the relay terminal (SEQ1809), the base station notifies each of the relay terminal and the transmission destination terminal (not illustrated) of the allocated resource via the DCI (SEQ1810).

C-3. Countermeasures to Prevent Packet Flooding

When relay communication is performed without limitation, there is a possibility that packets flood on the wireless transmission path and the channel (sidelink) is congested. Relay communication should be performed as much as necessary when needed. Here, several methods will be described for preventing packet flooding.

C-3-1. Method Using Packet Information Entropy (Freshness Information)

The final relay implementation probability is adjusted depending on the freshness or information entropy of the packet. Note that, the packet entropy can be defined on the basis of a combination of one or more parameters indicating the freshness of the packet as described above, but the information entropy used to limit relay communication is not limited to a specific definition.

When receiving a packet from the transmission source terminal, the relay terminal performs implementation determination of relay communication in accordance with the processing procedure illustrated in FIG. 13 or 14, for example. Then, even in a case where it is determined to perform relay communication, the relay terminal determines whether or not relay communication is actually performed depending on a predetermined probability. For example, if the freshness of the received packet is good, when the relay terminal determines to perform relay communication, the relay terminal finally performs relay communication with a probability close to 100%. On the other hand, when receiving a packet with low freshness, the relay terminal finally performs relay communication only with a low probability of less than 50%, for example, even in a case where it is determined to perform relay communication.

Note that, a relationship between freshness information of the packet and probability information may be set by the base station, or pre-configuration may be performed by the terminal itself. The pre-configuration mentioned here corresponds to, for example, setting at the time of shipment of the terminal (however, it is also assumed that the base station performs rewriting). In the former case, the base station can comprehensively control the occupancy rate of the relay packet in the resource pool in its own cell by adjusting the implementation probability of relay communication in the subordinate relay terminal. The base station can notify each relay terminal of information regarding the implementation probability of relay communication, for example, as RRC signaling or system information (SIB).

Furthermore, the relationship between the freshness information of the packet and the probability information may be determined in a frequency-specific manner. For example, the relay terminal may use a mapping table between a numerical value representing the freshness or information entropy of the packet and the implementation probability of relay communication to convert the freshness obtained from a packet to be subjected to relay communication into the implementation probability of relay communication. By using such a mapping table, for example, in the case of a packet having a high information entropy such as a freshness level of 1, the implementation probability of relay communication is converted to a high probability of 80%. Furthermore, a plurality of mapping tables may be set depending on the priority information of the packet. For example, even for the freshness information (or information entropy) of the same packet, in a case where the priority of the packet is high, a mapping table may be set for conversion to a higher implementation probability.

As already described in section B-4-2, implementation determination of relay communication should be performed depending on the channel congestion level of the sidelink. For example, when information such as the CBR or CR indicates that the channel is congested, the relay terminal should suppress implementation of relay communication in consideration of congestion prevention. Thus, a plurality of mapping tables may be set depending on the CBR or CR. For example, even for the freshness information (or information entropy) of the same packet, in a case where the CBR or CR indicates channel congestion, a mapping table may be set for conversion to a lower implementation probability.

Furthermore, in a case where the final relay implementation probability is adjusted depending on the freshness or information entropy of the packet, the freshness information of the packet may be updated. The freshness information of the packet is updated, by being used for the combination of one or more of several parameters regarding the packet mentioned in section B-4-1.

Note that, the calculation formula for deriving the freshness information from the parameters regarding the packet may be set by the base station, or pre-configuration may be performed in each user terminal. For example, notification of such a calculation formula is performed from the base station to the user terminal, as RRC signaling or system information (SIB).

C-3-2. Adjustment of Implementation Probability of Relay Communication Based on Information Obtained from Packet As already described in Section B-4-1, several parameters regarding the packet can be acquired from the transmission source terminal that has transmitted the packet to the relay terminal. The implementation probability of relay communication in the relay terminal may be changed by using an upper limit value of these parameters.

For example, in a case where an upper limit of the number of relay hops of the packet is set to 5, in a case where a count of the number of hops described in the packet exceeds 5, the relay terminal sets the implementation probability of relay communication to a low probability such as 20%.

Such a relationship between the upper limit value of the parameters and the implementation probability may be set by the base station, or pre-configuration may be performed in the terminal. In a case where the relationship is set by the base station, for example, notification is performed from the base station to the user terminal, as RRC signaling or system information (SIB).

C-3-3. Adjustment of Implementation Probability of Relay Communication Depending on Packet Transmission Status The relay terminal may change the implementation probability of relay communication by using the number of times of receiving the packet to be subjected to relay communication or ACK/NACK information from other terminals. In other words, the relay terminal determines a threshold value for each parameter indicating the packet transmission status, such as the number of receptions of the target packet and the ACK/NACK information, and sets a parameter exceeding the threshold value and the implementation probability of relay communication.

The relay terminal may suppress the implementation probability of relay communication when the number of receptions of the packet exceeds the threshold value, and, for example, the implementation probability of relay communication is set to 10% in a case where the target packet is received three times from another terminal.

A relationship between the threshold value for each parameter indicating the packet transmission status and the implementation probability of relay communication may be set by the base station, or pre-configuration may be performed in each user terminal. For example, notification is performed of the relationship between the threshold value and the implementation probability of relay communication from the base station to the user terminal, as RRC signaling or system information (SIB).

C-3-4. Implementation Timing of Packet Flood Prevention Measure

As described above, the relay terminal can take a measure to prevent packet flooding by adjusting the implementation probability of relay communication depending on the freshness information of the packet to be subject to relay communication and the parameters regarding the packet and the transmission status. The relay terminal may set the implementation probability immediately after performing implementation determination of relay communication. Furthermore, the implementation probability may be set as a part of the condition for the relay terminal to perform implementation determination of relay communication. For example, in the flowchart illustrated in FIG. 14, the final implementation determination processing of relay communication according to the implementation probability may be performed immediately before step S1402.

D. Example

Here, an example will be described of relay communication, with an example case where the relay terminal performs relay communication according to an instruction from the base station.

First, as the first condition for performing relay communication, an instruction of Enable of relay communication is set from the base station to the relay terminal.

Next, as the second condition for performing relay communication, terminal Capability information of the relay terminal is set. In other words, whether or not the relay terminal has Capability capable of performing relay communication is set as a condition for performing relay communication.

Next, when receiving a packet from another terminal, the relay terminal determines whether or not to perform relay communication for the packet. As described above, the relay terminal receives an instruction of Enable of relay communication from the base station, and the Capability information indicating capability of performing relay communication is set for the relay terminal itself. Thus, the relay terminal determines to perform relay communication on the basis of such information.

Thereafter, the relay terminal prepares for transmission for performing relay communication. For relay communication, it is necessary to secure a resource for communication. Here, referring to the information described in the SCI of the received packet, it is confirmed whether or not the transmission source terminal reserves the resource for relay communication. Then, in a case where the resource for relay communication is reserved, the relay terminal does not have to secure the resource by itself, and can perform relay communication by using the resource reserved by the transmission source terminal.

Furthermore, the relay terminal further adjusts the implementation probability immediately before starting relay communication. Assuming that the freshness level of the received packet is 2, the freshness level 2 is converted to an implementation probability of 80% with reference to the mapping table between the freshness level and implementation probability given by the base station. Thus, the relay terminal finally performs relay communication with a probability of 80%.

Then, the relay terminal performs determination using random numbers, and as a result, a probability of 20% is obtained. For this reason, the relay terminal finally cancels implementation of relay communication. Since no resource is used for relay communication, the relay terminal notifies peripheral terminals of a resource release message of the resource.

INDUSTRIAL APPLICABILITY

In the above, the technology disclosed in this specification has been described in detail with reference to specific embodiments. However, it is obvious that those skilled in the art can make modifications and substitutions of the embodiments without departing from the scope of the technology disclosed in this specification.

In this specification, the embodiments related to sidelink communication in V2X communication have been mainly described, but the gist of the technology disclosed in this specification is not limited to this. In other words, the technology disclosed in this specification can be similarly applied to use cases other than V2X communication. The technology disclosed in this specification can be applied to various types of direct communication between terminals such as Device to Device (D2D) communication and Machine Type Communication (MTC). Furthermore, the technology disclosed in this specification can also be applied to a moving cell (mobile base station), relay communication, and the like.

In short, the technology disclosed in this specification has been described in the form of exemplification, and the description content of this specification should not be interpreted restrictively. To determine the gist of the technology disclosed in this specification, the claims should be taken into consideration.

Note that, the technology disclosed in this specification can also have the following configuration.

(1) A communication device that operates as a terminal under control of a base station, the communication device including:
a communication unit that transmits and receives wireless signals; and
a control unit that controls transmission of data using a predetermined resource pool by the communication unit, in which
the control unit controls implementation of relay communication for a packet within the predetermined resource pool on the basis of at least one of information received from the base station, information received from another terminal, or information obtained from the terminal itself, during packet reception.

(1-1) The communication device according to (1), in which
the communication unit transmits and receives a wireless signal by using the predetermined resource pool for a sidelink allocated by the base station.

(2) The communication device according to (1), in which
the control unit determines implementation of relay communication on the basis of information that is received from the base station and that indicates an area in which relay communication should be performed or an area in which relay communication may be performed.

(2-1) The communication device according to (2), in which
the area is indicated by geographical coordinate information or zone identification information.

(3) The communication device according to any of (1) or (2), in which
the control unit determines implementation of relay communication on the basis of an instruction for implementation of relay communication or an instruction for stop of relay communication from the base station.

(3-1) The communication device according to (3), in which
the control unit receives an instruction to perform relay communication or an instruction to stop relay communication by RRC signaling or SIB broadcast from the base station.

(3-2) The communication device according to (3), in which
the control unit determines implementation of relay communication on the basis of information regarding a channel congestion level received from the base station.

(3-3) The communication device according to (3), in which
the control unit determines implementation of relay communication on the basis of the number of transmission terminals existing in the predetermined resource pool, received from the base station.

(3-4) The communication device according to (3), in which
the control unit determines implementation of relay communication on the basis of the amount of resources allocated by the base station.

(3-5) The communication device according to (3), in which
the control unit determines implementation of relay communication on the basis of the distance from the base station.

(4) The communication device according to any of (1) to (3), in which
the control unit determines implementation of relay communication on the basis of information regarding a method of allocating a resource for transmission of the packet, the information being obtained from a transmission source terminal of the packet.

(5) The communication device according to any of (1) to (4), in which
the control unit determines implementation of relay communication on the basis of priority information of the packet obtained from a transmission source terminal of the packet.

(6) The communication device according to any of (1) to (5), in which
the control unit determines implementation of relay communication on the basis of freshness information of the packet obtained from a transmission source terminal of the packet.

(7) The communication device according to (6), in which
the control unit determines implementation of relay communication on the basis of the freshness information obtained from at least one of the number of relay hops of the packet, a relay path of the packet, a generation time or transmission time of the packet, or a generation area or transmission area of the packet, the freshness information being obtained from a transmission source terminal of the packet.

(8) The communication device according to any of (1) to (7), in which
the control unit determines implementation of relay communication on the basis of at least one of a congestion level of a channel used for communication of the packet, a state of the channel, retransmission information of the packet, or position information of the terminal itself.

(9) The communication device according to any of (1) to (8), in which
the control unit further controls securing of a resource for relay communication.

(10) The communication device according to (9), in which
the control unit controls sensing of a resource for relay communication within the resource pool.

(11) The communication device according to (9), in which
the control unit controls implementation of relay communication for the packet using a resource for relay communication reserved by a transmission source terminal of the packet.

(12) The communication device according to (11), in which
the control unit controls sensing of a resource for relay communication by itself when the control unit is not able to use the resource for relay communication reserved by the transmission source terminal of the packet by performing sensing.

(13) The communication device according to (9), in which
the control unit controls implementation of relay communication for the packet using a resource for relay communication secured by the base station.

(14) The communication device according to any of (1) to (13), in which
the control unit further controls an implementation probability of relay communication for the packet.

(15) The communication device according to (14), in which
the control unit controls the implementation probability of relay communication for the packet depending on freshness information of the packet.
(16) The communication device according to (15), in which
the control unit controls the implementation probability of relay communication for the packet on the basis of a relationship between freshness information of a packet and an implementation probability, the relationship being set from the base station or preset in the terminal itself.
(17) The communication device according to any of (15) or (16), in which
the control unit controls the implementation probability of relay communication for the packet on the basis of a relationship between freshness information of a packet corresponding to priority information of the packet and an implementation probability.
(18) The communication device according to any of (15) to (17), in which
the control unit controls the implementation probability of relay communication for the packet on the basis of a relationship between freshness information of a packet corresponding to a channel congestion level used for relay communication and an implementation probability.
(19) The communication device according to any of (15) to (18), in which
the control unit updates the freshness information of the packet on the basis of information obtained from a transmission source terminal of the packet.
(20) A communication method in a communication device that operates as a terminal under control of a base station, the communication method including the steps of:
receiving a packet in a predetermined resource pool; and
controlling implementation of relay communication for the packet on the basis of at least one of information received from the base station, information received from another terminal, or information obtained from the terminal itself.

REFERENCE SIGNS LIST

10 UE (user-carrying)
20 UE (vehicle mounted)
22 Mobile body (vehicle)
30 eNB
40 GNSS satellite
50 RSU
110 Antenna unit
120 Wireless communication unit
130 GNSS signal processing unit
140 Storage unit
150 Processing unit
210 Antenna unit
220 Wireless communication unit
230 GNSS signal processing unit
240 Storage unit
250 Processing unit
310 Antenna unit
320 Wireless communication unit
330 Network communication unit
340 Storage unit
350 Processing unit
510 Antenna unit
520 Wireless communication unit
530 Storage unit
540 Processing unit

The invention claimed is:

1. A communication device that operates as a terminal under control of a base station, the communication device comprising circuitry configured to:
transmit and receive wireless signals;
control transmission of data using a predetermined resource pool;
control an implementation of a relay communication for a packet within the predetermined resource pool,
wherein the packet is received by the terminal from another terminal operating as a transmission source terminal of the packet;
acquire position information by using GPS or GNSS;
based on the acquired position information, determine the implementation of the relay communication on a basis of information that is configured to indicate an area in which the relay communication should be performed or an area in which the relay communication may be performed,
wherein the information configured to indicate the area in which the relay communication should be performed or the area in which the relay communication may be performed is at least one of information received from the base station, information received from the another terminal, or information obtained from the terminal itself during a reception of the packet; and
control implementation of the relay communication for the packet using a resource, of the predetermined resource pool, that is reserved by the transmission source terminal of the packet for the relay communication of the packet,
wherein the circuitry is further configured to control the implementation of the relay communication for the packet on a basis of a relationship between freshness information of the packet and an implementation probability,
wherein the freshness information of the packet corresponds to:
priority information of the packet, or
a level of congestion of a channel used for the relay communication.

2. The communication device according to claim 1, wherein the circuitry is further configured to determine the implementation of the relay communication on a basis of an instruction for the implementation of the relay communication or an instruction for a stop of the relay communication.

3. The communication device according to claim 1, wherein the circuitry is further configured to determine the implementation of the relay communication on a basis of priority information of the packet obtained from the transmission source terminal of the packet.

4. The communication device according to claim 1, wherein the freshness information is obtained from at least one of a number of relay hops of the packet from the transmission source terminal of the packet to the terminal, a relay path of the packet from the transmission source terminal of the packet to the terminal, a generation time or transmission time of the packet by the transmission source terminal of the packet, or a generation area or transmission area of the packet of the transmission source terminal of the packet, wherein the freshness information of the packet is obtained from the transmission source terminal of the packet.

5. The communication device according to claim 1, wherein the circuitry is further configured to determine the implementation of the relay communication on a basis of at least one of a state of the channel, other than the congestion level, used for the communication of the packet, retransmission information of the packet, or the acquired position information of the terminal.

6. The communication device according to claim 1, wherein the circuitry is further configured to control sensing of the resource for the relay communication.

7. The communication device according to claim 1, wherein the circuitry is further configured to update the freshness information of the packet on a basis of freshness update information obtained from the transmission source terminal of the packet.

8. The communication device according to claim 1, wherein the circuitry is further configured to determine the implementation of the relay communication on a basis of allocation information regarding a method of allocating the resource, of the predetermined resource pool, for the relay of the packet, the allocation information being obtained from the transmission source terminal of the packet.

9. A communication method for a terminal under control of a base station, the communication method comprising:
transmitting and receiving wireless signals;
controlling transmission of data using a predetermined resource pool;
controlling an implementation of a relay communication for a packet within the predetermined resource pool,
wherein the packet is received by the terminal from another terminal operating as a transmission source terminal of the packet;
acquiring position information by using GPS or GNSS;
based on the acquired position information, determining the implementation of the relay communication on a basis of information that is configured to indicate an area in which the relay communication should be performed or an area in which the relay communication may be performed,
wherein the information configured to indicate the area in which the relay communication should be performed or the area in which the relay communication may be performed is at least one of information received from the base station, information received from the another terminal, or information obtained from the terminal itself during a reception of the packet; and
controlling implementation of the relay communication for the packet using a resource, of the predetermined resource pool, that is reserved by the transmission source terminal of the packet for the relay communication of the packet,
wherein the communication method further comprises controlling the implementation of the relay communication for the packet on a basis of a relationship between freshness information of the packet and an implementation probability,
wherein the freshness information of the packet corresponds to:
priority information of the packet, or
a level of congestion of a channel used for the relay communication.

10. The communication method according to claim 9, the communication method further comprising determining the implementation of the relay communication on a basis of an instruction for the implementation of the relay communication or an instruction for a stop of the relay communication.

11. The communication method according to claim 9, the communication method further comprising determining the implementation of the relay communication on a basis of priority information of the packet obtained from the transmission source terminal of the packet.

12. The communication method according to claim 9, wherein the freshness information is obtained from at least one of a number of relay hops of the packet from the transmission source terminal of the packet to the terminal, a relay path of the packet from the transmission source terminal of the packet to the terminal, a generation time or transmission time of the packet by the transmission source terminal of the packet, or a generation area or transmission area of the packet of the transmission source terminal of the packet,
wherein the freshness information of the packet is obtained from the transmission source terminal of the packet.

13. The communication method according to claim 9, the communication method further comprising determining the implementation of the relay communication on a basis of at least one of a state of the channel, other than the congestion level, used for the relay communication of the packet, retransmission information of the packet, or the acquired position information of the terminal.

14. The communication method according to claim 9, the communication method further comprising controlling sensing of the resource for the relay communication.

15. The communication method according to claim 9, the communication method further comprising updating the freshness information of the packet on a basis of freshness update information obtained from the transmission source terminal of the packet.

16. The communication method according to claim 9, the communication method further comprising determining the implementation of the relay communication on a basis of allocation information regarding a method of allocating the resource, of the predetermined resource pool, for the relay of the packet, the allocation information being obtained from the transmission source terminal of the packet.

17. A non-transitory computer product containing instructions for a communication method for a terminal under control of a base station, the communication method comprising:
transmitting and receiving wireless signals;
controlling transmission of data using a predetermined resource pool;
controlling an implementation of a relay communication for a packet within the predetermined resource pool,
wherein the packet is received by the terminal from another terminal operating as a transmission source terminal of the packet;
acquiring position information by using GPS or GNSS;
based on the acquired position information, determining the implementation of the relay communication on a basis of the information that is configured to indicate an area in which the relay communication should be performed or an area in which the relay communication may be performed,
wherein the information configured to indicate the area in which the relay communication should be performed or the area in which the relay communication may be performed is at least one of information received from the base station, information received from the another terminal, or information obtained from the terminal itself during a reception of the packet; and controlling implementation of the relay communication for the packet using a resource, of the predetermined resource pool, that is reserved by the transmission source terminal of the packet for the relay communication of the packet, wherein the communication method further comprises controlling the implementation of the relay communication for the packet on a basis of a relationship between freshness information of the packet and an implementation probability, wherein the freshness information of the packet corresponds to:
   priority information of the packet, or
   a level of congestion of a channel used for the relay communication.

* * * * *